(12) United States Patent
Meir et al.

(10) Patent No.: US 8,321,757 B2
(45) Date of Patent: Nov. 27, 2012

(54) METHOD AND APPARATUS FOR ERROR CORRECTION

(75) Inventors: Avraham Meir, Rishon Lezion (IL); Menahem Lasser, Kohav Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 1129 days.

(21) Appl. No.: 12/143,796

(22) Filed: Jun. 22, 2008

(65) Prior Publication Data

US 2009/0319843 A1 Dec. 24, 2009

(51) Int. Cl.
*G11C 29/00* (2006.01)
(52) U.S. Cl. ....................................... 714/763
(58) Field of Classification Search ............... 714/763
See application file for complete search history.

(56) References Cited

U.S. PATENT DOCUMENTS

| | | | | |
|---|---|---|---|---|
| 5,146,592 A | * | 9/1992 | Pfeiffer et al. | 715/807 |
| 6,751,766 B2 | | 6/2004 | Guterman et al. | |
| 7,567,464 B2 | * | 7/2009 | Gendrier et al. | 365/185.25 |
| 2002/0144196 A1 | * | 10/2002 | Chen | 714/718 |
| 2007/0277066 A1 | * | 11/2007 | Gajapathy et al. | 714/724 |
| 2008/0148115 A1 | | 6/2008 | Sokolov et al. | |
| 2010/0115376 A1 | * | 5/2010 | Shalvi et al. | 714/763 |

FOREIGN PATENT DOCUMENTS

| | | |
|---|---|---|
| WO | WO2007132457 | 11/2007 |
| WO | WO2008053472 | 5/2008 |
| WO | WO2008068747 | 6/2008 |

\* cited by examiner

*Primary Examiner* — Guy Lamarre
(74) *Attorney, Agent, or Firm* — Martine Penilla Group, LLP.

(57) ABSTRACT

Methods, apparatus and computer readable medium for handling error correction in a memory are disclosed. In some embodiments, after an attempt is made to write original data to a 'target' memory, data is read back from the target memory in a 'first read operation', thereby generating first read data. After the first read operation, the first read data is compared to the original data and/or an indication of a difference between the original data and the first data is determined. The information obtained by effecting the data-comparison and/or information related to the difference indication is used when correcting errors in data read back from the target memory in a 'second read operation.'. The presently-disclosed teachings are applicable to any kind of memory including (i) non-volatile memories such as flash memory, magnetic memory and optical storage and (ii) volatile memory such as SRAM or DRAM.

16 Claims, 17 Drawing Sheets

INDIRECT
COMPARISON (some examples)

Effect At least one Function Computation Operation S481 Selected from the Group Consisting of:
a) Computing an Indicative, Non-Identity Function $f(Original\ Data)$
b) Computing an Indicative, Non-Identity Function $g(First\ Read\ Data)$ Effect a Direct S483 Comparison Between:
i) Original Data and/or a Function of Original Data
AND
ii) First Read Data and/or a Function of First Read Data

DIRECT
COMPARISON

Effect S479 a Direct Comparison Between The First Read Data And the Original Data Compare S419 the First Read Data to the Original Data

FIG. 9A

METHOD AND APPARATUS FOR ERROR CORRECTION

FIELD OF THE INVENTION

The present invention relates to apparatus, methods, and computer medium for correcting errors in data read from a memory such as a flash memory.

BACKGROUND AND RELATED ART

Error Correction In Flash Memory Devices

Flash memory devices have been known for many years. NAND-type flash memories differ from other types of flash memories (e.g. NOR-type), among other characteristics, by the fact that a certain number of information bits, written to the memory, may be read from the memory in a "flipped" state (i.e. different from the state that the original bits were written to the memory).

In order to overcome this phenomenon and to make NAND-type memories usable by real applications, it is a common technique to use Error Correction Codes (ECC) in conjunction with these memories.

There is an ongoing need for improved techniques and apparatus for handling error correction in flash memory devices, and in storage devices that include memory other than flash memory.

A Discussion of Exemplary Device Architecture

FIG. 1A (prior art) is a block diagram of a flash memory storage device 260 (prior art). The flash memory storage device includes a flash memory 270 and a flash controller 280 operative to read data and to write data to the flash memory 270. The terms "program", "programming", "programmed", and "programmable" are used herein interchangeably with the terms "write", "writing", "written", and "writable", respectively, to denote the storing of data in a flash memory.

One example of a flash memory storage device is a "peripheral flash storage device." Peripheral flash storage devices are well-known in the art of computing, in form factors such as USB flash drives (UFD); PC-cards; and small storage cards used with digital cameras, music players, handheld and palm-top computers, and cellular telephones.

In some implementations, the peripheral flash storage device is deployed within a housing of the host device.

FIG. 1B (prior art) is a block diagram of a peripheral flash memory storage device 260* (the asterisk indicates that the flash memory storage device is a peripheral flash storage device) that is "coupled with" or configured to exchange data with a host device 310 (for example, a laptop or desktop or handheld computers, digital camera, mobile telephone, music player, and video game consoles) via device-side interface 250. Peripheral flash memory storage device 260* and host device 310 communicate with each other via communications link 300 using host-side interface 350 and device-side interface 250 (for example, respective USB or SD interfaces).

In one example, flash memory storage device 260* provides data-reading and data-writing services to host device 310. Data received by flash memory storage device 260* from host device 310 is written to flash memory 270 by flash controller 280. Furthermore, in response to "data read" requests received by flash memory storage, flash controller 280 reads data from flash memory 270.

Errors may be corrected in the read data at "read time" or at any later time. The error-correction may be carried out at least in part by flash controller 280, at least in part by host device 310 (for example, by execution of executable code 340 in RAM 330 by host-side processor 320 or in any other manner), and any other location and in any other manner.

The skilled artisan will appreciate that "peripheral flash storage devices" are not the only class of flash memory storage devices. For example, certain mobile phones, desktop or laptop computers, PDA devices or other electronic devices may also include flash memory and a flash controller, and may not necessarily be configured to couple with a host device and/or provide data reading services and/or data writing service for a host device.

The skilled artisan will appreciate that the flash memory devices described in FIGS. 1A-1B are just one class of peripheral storage memory device, and other memory devices may include other types of volatile memory, such as magnetic memory (for example, magnetoresistive random-access memory (MRAM) or hard disk platters). Furthermore, it is appreciated that the some peripheral storage devices may use volatile memory instead of, or in addition to, flash memory 270.

As illustrated in FIG. 1C (prior art), in some systems, a memory (i.e. including but not limited to a flash memory) may include a 'cache storage region 272' and a 'main storage region 274' portion where data is first written to the 'cache storage region 272' (for example, copied from RAM of a flash device controller 280 to the cache storage region 272 of flash memory) and is subsequently copied from the cache storage region 272 to the main storage region 274.

In many examples, (i) the cache storage region 272 is written to using a 'faster writing mode' than a writing mode used for main storage region 274; and/or (ii) the main storage region 274 is larger (i.e. has a greater capacity) than the cache storage region 272; and/or (iii) the data stored to the cache storage region 272 is stored with a greater degree of reliability (i.e. and is less prone to errors at programming time and/or subsequent to programming time) than the data stored to the main storage region 274.

In one particular example, the 'cache storage region 272 includes flash blocks where N bits of data are stored in each flash cell where N is a positive integer, and the main storage region 274 includes flash blocks where M bits of data are stored in each flash cell where M is a positive integer that exceeds N.

SUMMARY OF EMBODIMENTS OF THE INVENTION

Various embodiments address these and related issues, examples of which embodiments, including methods and systems, are provided herein.

One embodiment is a method for handling error correction. This method comprises the steps of: a) writing original data to a memory; b) subsequent to the writing, reading from the memory, thereby generating first read data; c) comparing the first read data to the original data; d) subsequent to the comparing, reading from the memory, thereby generating second read data; and e) in accordance with results of the comparing of step (c), correcting errors in the second read data.

The aforementioned method may be implemented for any volatile or non-volatile memory, including but not limited to flash memory, optical storage, magnetic memory, static random access memory (SRAM) and dynamic random access memory (DRAM).

In some embodiments, the comparing of step (c) may include effecting at least one comparison selected from the group consisting of i) a direct comparison between the first read data and the original data; ii) a direct comparison between the first read data and an indicative non-identity function of the original data; iii) a direct comparison between an indicative non-identity function of the first read data and the original data; and iv) a direct comparison between an indicative non-identity function of the first read data and an indicative non-identity function of the original data.

In some embodiments, the reading of step (b) may be carried out in response to a completion of the writing of step (a).

The reading of step (b) may be carried out at any time. In one particular embodiment, the reading of step (b) is carried out immediately after the completion of the writing of step (a).

In some embodiments, the writing of step (a) is to a destination location within the memory; and ii) at least one of the reading of step (b) and the reading of step (d) is from the destination location within the memory.

In some embodiments, the method further comprises determining at least one error indication selected from the group consisting of: i) a number of bit errors in the first read data; ii) a number of memory cells that contains erroneous data; iii) a list of one or more bit locations in which erroneous data is stored; iv) a list of one or more memory cells in which erroneous data is stored; and v) a value of a probability that a particular bit or plurality of bits in the first read data is erroneous, wherein the error correcting of step (e) is carried out in accordance with the determined at least one error indication.

A number of techniques for correcting errors according to the determined operational parameter are described herein.

In one example, i) the original data is written, in step (a), to a main storage area of the memory; ii) the reading of step (b) includes reading from the main storage area of the memory such that the first read data is generated from contents of the main storage area; and iii) the method further comprises: before the writing of step (a), reading from a cache area of the memory distinct from the main storage area of the memory in order to obtain the original data.

In yet another example, the correcting of errors according to the results of the comparing of step (c) includes selecting a decoding bus width size in accordance with the results of the comparing of step (c).

In yet another example, the correcting of errors according to the results of the comparing of step (c) includes effecting at least one of: i) choosing one of a first decoder and a second decoder in accordance with the results of the comparing of step (e) and correcting errors using only the chosen decoder of the first and second decoders; and ii) choosing one of a first mode of a decoder and a second mode of the decoder in accordance with the results of the comparing of step (c) and correcting errors using only the chosen mode of the first and second modes.

In yet another example, the correcting of errors according to the results of the comparing of step (c) includes at least one of: i) deciding whether to: A) attempt to correct errors using a lighter-weight decoder or B) to attempt to correct errors using only a heavier-weight decoder that is heavier than the lighter weight decoder; ii) deciding whether to: A) attempt to correct errors using a faster decoder or B) to attempt to correct errors using only a slower decoder that is slower than the faster decoder; iii) deciding whether to: A) attempt to correct errors using a lighter-weight mode of a particular decoder or B) to attempt to correct errors using only a heavier-weight mode of the particular decoder that is heavier than the lighter weight mode; and iv) deciding whether to: A) attempt to correct errors using a faster mode of a particular decoder or B) to attempt to correct errors using only a slower mode of the particular decoder that is slower than the faster mode.

In yet another example, the correcting of errors in the second data according to the results of the comparing of step (c) includes determining, in accordance with the results of the comparing of step (c), one or more bit-probability values for the second read data.

Some presently-disclosed embodiments provide a method for handling error correction. The method comprises the steps of: a) copying original data from a cache area of a memory to a main storage area of the memory; b) subsequent to the copying, reading from the main storage area of the memory, thereby generating first main storage read data; c) subsequent to the copying, reading from the cache area of the memory, thereby generating cache read data; d) comparing the cache read data to the first main storage read data; e) subsequent to the comparing, reading from the main storage area of the memory, thereby generating second main storage read data; and f) in accordance with results of the comparing of step (d), correcting errors in the second main storage read data.

In some embodiments, the comparing of step (d) includes effecting at least one comparison selected from the group consisting of: i) a direct comparison between the first main storage read data and the cache read data; ii) a direct comparison between the first main storage read data and an indicative non-identity function of the cache read data; iii) a direct comparison between an indicative non-identity function of the first main storage read data and the cache read data; and iv) a direct comparison between an indicative non-identity function of the first read main storage data and an indicative non-identity function of the cache read data.

Some presently-disclosed embodiments provide a method for handling error correction. The method comprises the steps of a) writing original data to a memory; b) subsequent to the writing, reading from the memory, thereby generating first read data; c) determining, from the first read data, an indication of a difference between the first read data and the original data; d) subsequent to the determining of the difference indication, reading from the memory, thereby generating second read data; and e) in accordance with the difference indication, correcting errors in the second read data.

Some presently-disclosed embodiments provide a controller for a memory device is disclosed. The controller comprises: a) circuitry that is operative to: i) write original data to a memory; ii) subsequent to the writing, read from the memory, thereby generating first read data; iii) compare the first read data to the original data; iv) subsequent to the comparing, read from the memory, thereby generating second read data; and v) in accordance with results of the comparing, correct errors in the second read data.

In some embodiments, the circuitry includes at least one of software and firmware.

In some embodiments, the controller is configured to write the original data to and to read from a volatile memory.

In some embodiments, the controller is configured to write the original data to and to read from a non-volatile memory In some embodiments, controller is operative in step (a)(iii) to effect at least one comparison selected from the group consisting of: i) a direct comparison between the first read data and the original data; ii) a direct comparison between the first read data and an indicative non-identity function of the original data; iii) a direct comparison between an indicative non-identity function of the first read data and the original data; and iv) a direct comparison between an indicative non-identity function of the first read data and an indicative non-identity function of the original data;

In some embodiments, the controller is operative to carry out the reading of step (a)(ii) in response to a completion of the writing of step (a)(i).

In some embodiments, the controller is operative to carry out the reading of step (a)(ii) immediately after the completion of the writing of step (a)(i).

In some embodiments, i) the controller is operative to carry out the writing of step (a)(i) to a destination location within the memory; and ii) the controller is further operative to carry out at least one of the reading of step (a)(ii) and the reading of step (a)(iv) from the destination location within the memory.

In some embodiments, i) the controller is further operative to determine at least one error indication selected from the group consisting of: A) a number of bit errors in the first read data; B) a number of memory cells that contains erroneous data; C) a list of one or more bit locations in which erroneous data is stored; D) a list of one or more memory cells in which erroneous data is stored; and E) a value of a probability that a particular bit or plurality of bits in the first read data is erroneous; and ii) the controller is operative to carry out the error correcting of step (a)(v) in accordance with the determined at least one error indication.

In some embodiments, i) the controller is operative to write the original data to a main storage area of the memory; ii) the controller is operative to carry out the reading of step (a)(ii) in a manner that includes reading from the main storage area of the memory such that the first read data is generated from contents of the main storage area; and iii) the controller is further operative, before the writing of step (a)(i), to read from a cache area of the memory distinct from the main storage area of the memory in order to obtain the original data.

In some embodiments, the controller is operative to carry out the correcting of errors according to the results of the comparing of step (a)(iii) in a manner that includes selecting a decoding bus width size in accordance with the results of the comparing of step (a)(iii).

In some embodiments, the controller is operative to carry out the correcting of errors according to the results of the comparing of step (a)(iii) in a manner that includes effecting at least one of: i) choosing one of a first decoder and a second decoder in accordance with the results of the comparing of step (a)(iii) and correcting errors using only the chosen decoder of the first and second decoders; and ii) choosing one of a first mode of a decoder and a second mode of the decoder in accordance with the results of the comparing of step (a)(iii) and correcting errors using only the chosen mode of the first and second modes.

In some embodiments, the controller is operative to carry out the correcting of errors according to the results of the comparing of step (a)(iii) in a manner that includes at least one of: i) deciding whether to: A) attempt to correct errors using a lighter-weight decoder or B) to attempt to correct errors using only a heavier-weight decoder that is heavier than the lighter weight decoder; ii) deciding whether to: A) attempt to correct errors using a faster decoder or B) to attempt to correct errors using only a slower decoder that is slower than the faster decoder; iii) deciding whether to: A) attempt to correct errors using a lighter-weight mode of a particular decoder or B) to attempt to correct errors using only a heavier-weight mode of the particular decoder that is heavier than the lighter weight mode; and iv) deciding whether to: A) attempt to correct errors using a faster mode of a particular decoder or B) to attempt to correct errors using only a slower mode of the particular decoder that is slower than the faster mode.

In some embodiments, the controller is operative to carry out the correcting of errors in the second read data according to the results of the comparing of step in a manner that includes determining, in accordance with the results of the comparing of step, one or more bit-probability values for the second read data.

Some presently-disclosed embodiments provide a controller for a memory device is disclosed. controller for a memory device. The controller comprises: a) circuitry that is operative to: i) copy original data from a cache area of a memory to a main storage area of the memory; ii) subsequent to the copying, read from the main storage area of the memory, thereby generating first main storage read data; iii) subsequent to the copying, read from the cache area of the memory, thereby generating cache read data; iv) compare the cache read data to the first main storage read data; v) subsequent to the comparing, read from the main storage area of the memory, thereby generating second main storage read data; and vi) in accordance with results of the comparing of step (d), correct errors in the second main storage read data.

In some embodiments, the circuitry includes at least one of software and firmware.

In some embodiments, the controller is operative, in step (a)(iv) to effect at least one comparison selected from the group consisting of: i) a direct comparison between the first main storage read data and the cache read data; ii) a direct comparison between the first main storage read data and an indicative non-identity function of the cache read data; iii) a direct comparison between an indicative non-identity function of the first main storage read data and the cache read data; and iv) a direct comparison between an indicative non-identity function of the first read main storage data and an indicative non-identity function of the cache read data.

Some presently-disclosed embodiments provide a controller for a memory device is disclosed. controller for a memory device, the controller comprising a) circuitry that is operative to: i) write original data to a memory; ii) subsequent to the writing, read from the memory, thereby generating first read data; iii) determine, from the first read data, an indication of a difference between the first read data and the original data; iv) subsequent to the determining of the difference indication, read from the memory, thereby generating second read data; and v) in accordance with the difference indication, correct errors in the second read data.

In some embodiments, the circuitry includes at least one of software and firmware.

It is now disclosed for the first time a computer readable medium having stored therein computer readable program code for handling error correction for a memory, the program code being operable to: a) write original data to the memory; b) subsequent to the writing, read from the memory, thereby generating first read data; c) compare the first read data to the original data; d) subsequent to the comparing, read from the memory, thereby generating second read data; and e) in accordance with results of the comparing of step (c), correct errors in the second read data.

It is now disclosed for the first time a computer readable medium having stored therein computer readable program code for handling error correction for a memory, the program code being operable to: a) copy original data from a cache area of the memory to a main storage area of the memory; b) subsequent to the copying, read from the main storage area of the memory, thereby generating first main storage read data; c) subsequent to the copying, read from the cache area of the memory, thereby generating cache read data; d) compare the cache read data to the first main storage read data; e) subsequent to the comparing, read from the main storage area of the memory, thereby generating second main storage read data; and f) in accordance with results of the comparing of step (d), correct errors in the second main storage read data.

It is now disclosed for the first time a computer readable medium having stored therein computer readable program code for handling error correction for a memory, the program code being operable to: a) write original data to the memory; b) subsequent to the writing, read from the memory, thereby generating first read data; c) determine, from the first read data, an indication of a difference between the first read data and the original data; d) subsequent to the determining of the difference indication, read from the memory, thereby generating second read data; and e) in accordance with the difference indication, correct errors in the second read data.

It is noted that features described above as pertaining to certain embodiments may also be included in other embodiments, unless indicated to the contrary herein below.

BRIEF DESCRIPTION OF THE DRAWINGS

FIG. 9A-9B is illustrate different routines for comparing data.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods and apparatuses for handling error correction is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e. meaning "must").

Embodiments of the present invention relate to the surprising discovery that it is useful, after writing 'original' data to a flash memory, to: (i) read back from the flash memory (i.e. to effect a 'first read operation'); (ii) to compare the read-back data to the original data; and (iii) after the comparing, when data is subsequently read from the flash memory (i.e. in a 'second read operation'), to correct errors in the subsequently-read data in accordance with information generated by the comparing of the read-back data to the original data.

In some embodiments, the information generated by the comparing is indicative of a difference between the original data and the flash-residing data which may have been corrupted by errors that occur at programming time, for example, errors caused by so-called 'program disturb effects.' Thus, the information generated by the comparing may provide an indication of 'how successful' the programming or writing of the data to flash memory was.

This information about 'how successful' the programming or writing of the data to flash memory was may be used when later correcting errors in the data read during the "second read operation." For example, in the event that the information obtained by the comparing indicates that the memory data-writing was relatively "successful" and/or that the quality of the data written to the memory is relatively "high," then it may be useful to subsequently correct errors in data read from the memory in a relatively "optimistic" manner. Otherwise, a more "pessimistic" technique of correcting errors may be preferred.

Various examples of relatively "optimistic" and "pessimistic" techniques are described below with reference to FIGS. 5-8.

Figure 6A:
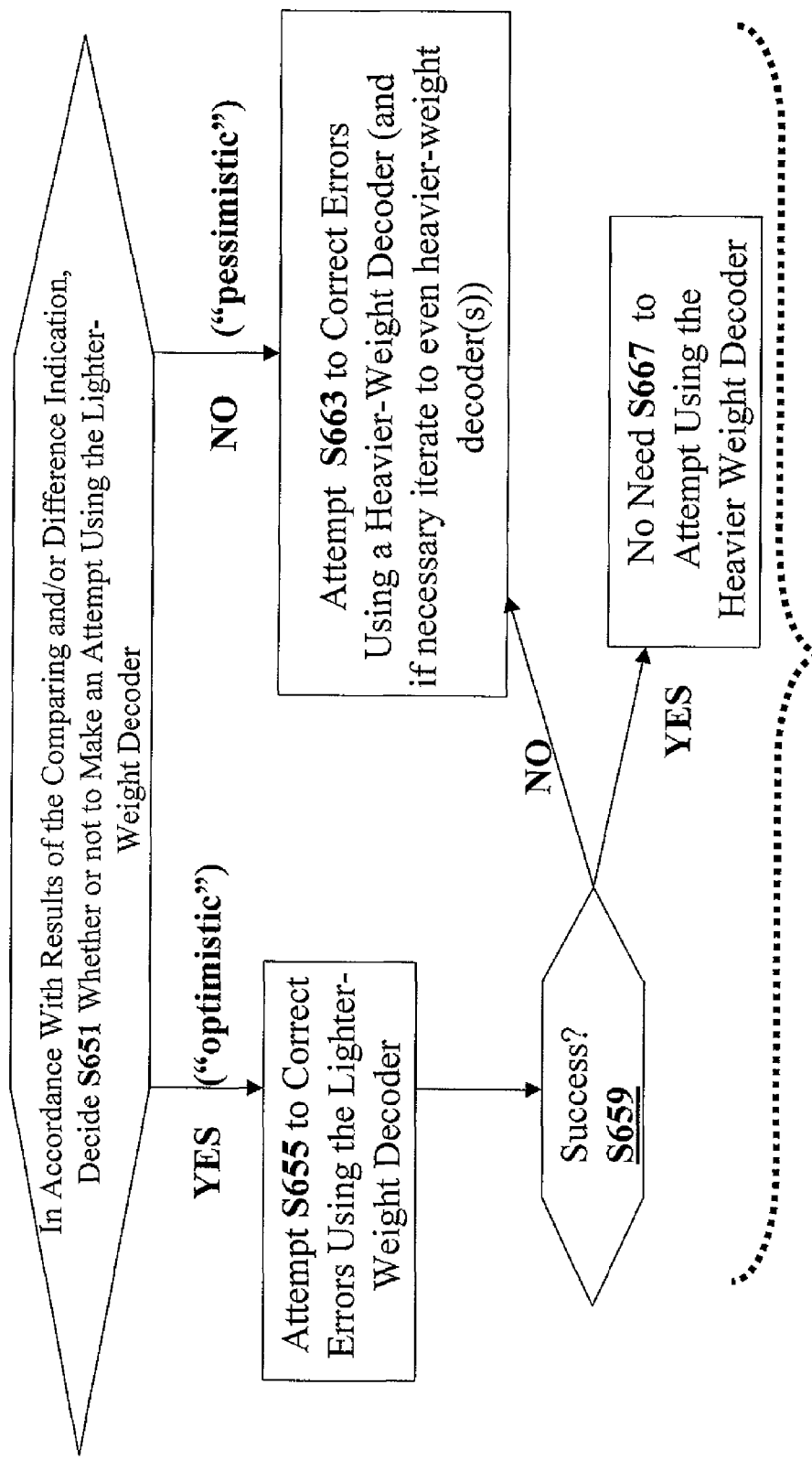

In one non-limiting example related to FIG. 6A, either a "heavier weight" decoder or a "lighter weight" decoder may be used when correcting errors. In this example, the "lighter weight" decoder is quicker and/or consumes fewer computational resources than the "heavier weight" decoder, but is less likely to successfully correct errors (i.e. is a associated with a lower probability of failure).

It is appreciated the examples of 'optimistic/pessimistic' error correction of FIGS. 5-8 are not intended as an exhaustive list, and that other 'pessimistic' or 'optimistic' techniques may be used.

According to this non-limiting example related to FIG. 6A, later, when correcting data from the "second read operation" the information obtained from the comparing after the "first read" operation can be used to accelerate error correction. In the event that the earlier comparing between original data and data read from flash indicates that flash-residing data is (or was at some earlier point in time) relatively free of errors, it may be advisable to later adopt an 'optimistic strategy' and attempt to correct errors using the 'lighter weight' decoder which is faster. Alternatively, in the event that the comparing indicates that flash-residing data includes (or included at some earlier point in time) a 'larger number of errors', it may be advisable to later adopt an 'pessimistic strategy' and attempt to correct errors using the 'heaver weight' decoder which is slower.

It is noted that this is just one non-limiting example of "correcting errors according to the results of the comparing" and various additional examples are described below. Furthermore, additional techniques related to correcting errors in accordance with an indication of a difference between read-back data and original data are disclosed below.

In some embodiments, the reading back of the "first read operation" is carried out "immediately after" the first read operation (i.e. within a few seconds). This may be useful for collecting information indicative of the quality of the data and/or 'target memory' at programming time or close to programming time. Alternatively or additionally, the reading back may be carried out at a later time.

Throughout the present disclosure, when certain teachings are explained in terms of "flash memory," it is appreciated that these teachings may also be applicable to other memories other than flash memory. Exemplary memories include but are not limited to non-volatile memories other than flash memory (for example, magnetic memories or optical storage) and volatile memories such as SRAM or DRAM.

Exemplary magnetic memories include but are not limited to magnetoresistive random-access memories (MRAM) and hard disk platters.

The skilled artisan will appreciate that presently-disclosed techniques for correcting errors may be combined with any other technique for correcting errors in data read from memory.

Before describing the drawings, a general overview of using ECC in flash memories is presented, and definitions of various terms are provided (in the next two sections).

Error Correction In Flash Memory Devices

A general overview of using ECC in flash memories is presented below and includes the following steps:

(1) Before writing data to the memory, an ECC algorithm is applied to the data in order to compute additional (i.e. redundant) bits, which are later used for error detection and correction. These redundant bits are often called "parity bits" or "parity". A combination of the data input into an ECC module and the parity output by that module is called a codeword. Each different value of input data to an ECC module results in a different codeword.

(2) The entire codeword (i.e., the original data and the parity) is recorded to the flash memory. It should be noted, that the actual size of NAND-type flash memory is larger than the size of the original data, and the memory is designed to accommodate parity as well.

(3) When the data are retrieved from the memory, the entire codeword is read again, and an ECC algorithm is applied to the data and the parity in order to detect and correct possible "bit flips" (i.e., errors).

It should be noted that the implementation of ECC may be done by hardware, software, or a combination of hardware and software. Furthermore, ECC may be implemented within a memory device, within a memory device controller, within a host computer, or may be "distributed" among these components of a system.

The algorithms in common use include Reed-Solomon, BCH, Hamming, and many others. Each ECC algorithm is composed of two parts—the part that receives the data bits and generates the parity bits (or equivalently, generates the codeword), and the part that receives the codeword and generates the corrected data bits. The first part is called the "encoder" and is used during writing, and the second part is called the "decoder" and is used, during reading. Each of the two parts may be implemented in either hardware or software, and it is also possible to have one part implemented in hardware while the other part implemented in software. It also is possible for each of the parts to be implemented in a combination of hardware and software.

Receiving the data bits and generating the corresponding codeword is termed "encoding." Receiving the codeword and generating the corrected data bits is termed "decoding."

It should be noted that there actually are two kinds of ECC. The kind of ECC described above, in which the identity of the data bits is preserved in the codeword, is called "systematic" ECC. In "nonsystematic" ECC, the data bits are converted to a codeword in which the identity of the original data bits is not preserved.

Selecting an algorithm, like BCH, as the ECC algorithm to be used in a flash memory system, does not uniquely define the selected solution. Any such ECC algorithm is actually not a single algorithm but a family of algorithms. The algorithms within the same family differ among themselves in the amount of data bits they are able to protect. An algorithm that needs to protect 100 data bits is not identical to an algorithm that needs to protect 10,000 data bits, even though the two algorithms are typically quite similar and operate on the same principles.

But even two algorithms of the same family that both protect the same number of data bits are not necessarily identical. The algorithms may differ in the level of reliability provided, or equivalently—in the number of bit errors in the data that the algorithms are able to correct. For example, one system may require the protection of chunks of 1,000 data bits against any combination of up to 3 bit errors (but not against the occurrence of 4 or more bit errors), while in another system a much higher reliability is desired and therefore it is required to protect chunks of 1,000 data bits against any combination of up to 10 bit errors. Typically, protecting against more errors requires the use of more parity bits (or longer codewords), making the ECC scheme less "efficient", where efficiency is measured by the ratio of the number of data bits in a codeword to the total number of bits in the codeword (including, in systematic ECC, both data bits and parity bits). This measure is typically called the "rate" of the ECC coding.

Different ECC algorithms and implementations also differ in other aspects—speed of the encoding process, speed of the decoding process, complexity of the encoding process, complexity of the decoding process, acceptable error rate in the input to the decoder (defined according to the quality of the storage cells), and more. The complexity of encoding and decoding is important not only because it affects the speed of the operation, but also because it affects the power consumption and silicon area of hardware implementations of the ECC scheme.

It is thus evident that the selection of an ECC solution for a memory system involves a complex trade-off between multiple considerations. Some non-limiting rules-of-thumb typical in the art of ECC designs are:

a. For a given memory reliability, the better the output reliability (or equivalently the higher the number of correctable errors) the lower the rate of the code (or equivalently, for systematic ECC, the more parity bits are required)

b. For a given memory reliability, the better the output reliability, the more complex is the decoder.

c. For a given level of output reliability, the higher the rate of the code, the more complex is the decoder.

d. For a given level of output reliability, the higher the rate of the code, the slower is the decoding.

When designing an ECC solution, one typically starts from the error rate at the decoders input (dictated by the quality of the storage cells) and the desired output reliability (dictated by the applications requirements). Based on these numbers one typically selects a specific ECC family, calculates the required number of parity bits, and then estimates the speed and complexity of the encoder and decoder.

In some cases the most important consideration for the system' designer is the speed of the decoding, as this may put a limit on the speed of reading the data out from the memory. In such cases the designer may encounter a dilemma—the ECC scheme required for meeting the output reliability requirements may turn out to result in a quite complex decoder with slow operation, not satisfying the speed target of the system. But, on the other hand, selecting an ECC scheme that is relatively simple, and that results in fast decoding, does not provide the required output reliability level.

Definitions

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Because certain types of memory (for example, flash memory, magnetic memory, optical storage, or volatile memory) are "corrupting medium," one or more errors are sometimes introduced into "original" data that is written to the memory, so that when the data (i.e. a representation of the original data) is read back from the memory, one or more information bits are "flipped."

"Original data" is data for which an attempt is made to write to a "target memory" (for example, flash memory or any other memory that is potentially a corrupting medium). In some cases, the data that is actually stored in the 'target memory' as a result of the write attempt is identical to the 'original data.' In other cases, one or more errors are introduced into the data residing in memory as it is written into the 'target memory' (or shortly thereafter)—for example, due to program disturb effects.

The physical or logical location in target memory for which an attempt is made to write 'original data' is referred to as the 'destination location' in the 'target memory.'

The process of reconstructing the original, error-free data from the data read back from the memory is "correcting errors." Although the term "correcting errors" is used in the plural, it is appreciated that "correcting errors" also refers to correcting a single error. It is appreciated that in some embodiments, the "correcting" of errors may also include one or more failed attempts to correct errors.

As noted above, error correction techniques may be classified either as: (i) systematic error correction, in which the identity of the data bits is preserved in the codeword and (ii) "nonsystematic" error correction, where the data bits are converted to a codeword in which the identity of the original data bits is not preserved. In the former case, an attempt is made to write the data bits which are preserved in the codeword to the 'target memory,' and these data bits are considered 'original data.' In the later case, an attempt is made to write the 'converted' or 'encoded' data bits to the 'target memory' and these converted or 'encoded' data bits are considered 'original data.'

Some embodiments include 'comparing' data read back from the 'target memory' to 'original data.' In one implementation, this may be carried out by effecting a 'direct comparison' between the read-back data and the original data, in which case the original data and the read-back data are checked, fully or partially, for a match in their contents. Alternatively or additionally, the comparing of read-back data to 'original data' may be an 'indirect comparison' involving a mathematical function of the original data and/or a mathematical function of the first read data. The skilled artisan is referred to FIG. 9 and the accompanying discussion for further details.

As noted earlier, in order to correct errors, a "decoder" may be used, in order to recover the original data from a representation of a codeword. Some embodiments involve multiple decoders, including "lighter weight" decoders and "heavier weight decoders."

The terms "heavier weight" and "lighter weight" are used to compare two decoders and/or two modes of a single decoder. The "heavier weight" decoder (or heavier weight mode of a single decoder) either (i) consumes more current than the "lighter weight" counterpart and/or (ii) requires more memory (either for computer-executable code of the decoder itself and/or more memory for storing "intermediate results" of calculations when correcting errors) than the "lighter weight" counterpart and/or (iii) requires more computational operations than the "lighter weight" counterpart.

Figure 2:
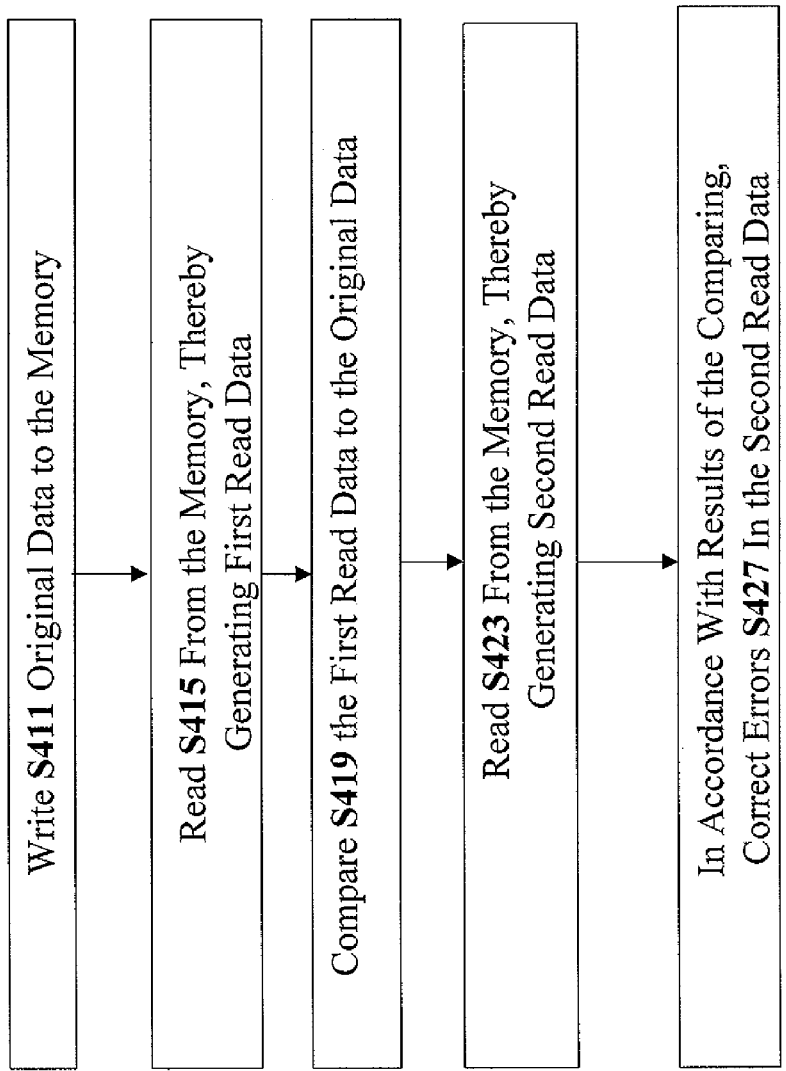
FIGS. 2-8, 10 are flow charts of error-correction techniques according to some embodiments.

A Discussion of FIG. 2

FIG. 2 is a flow chart of an exemplary technique for handling error correction in accordance with some embodiments. In step S411, original data is written to the memory—i.e. an attempt is made to write the original data into the 'target memory.' As noted earlier, there is no guarantee that what actually resides in the 'target memory' immediately after the writing operation is identical to the original data for which the attempt was made—for example, due to program disturb effects which may introduce errors into the data at 'write-time.'

Figure 1A:
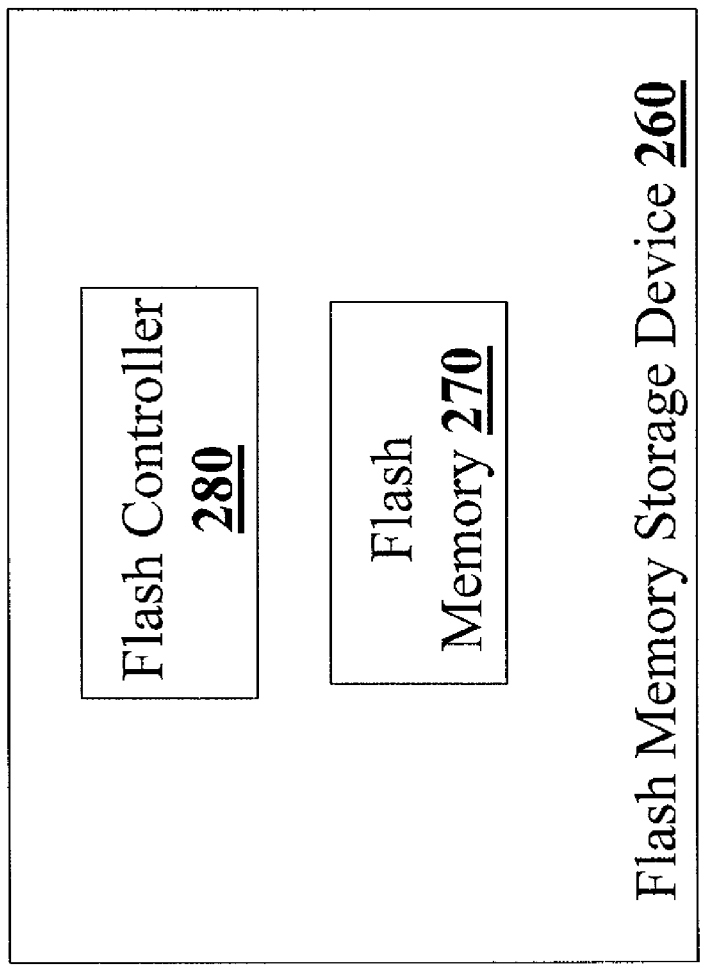
FIG. 1A is a block diagram of a conventional flash memory storage device.
Figure 1B:
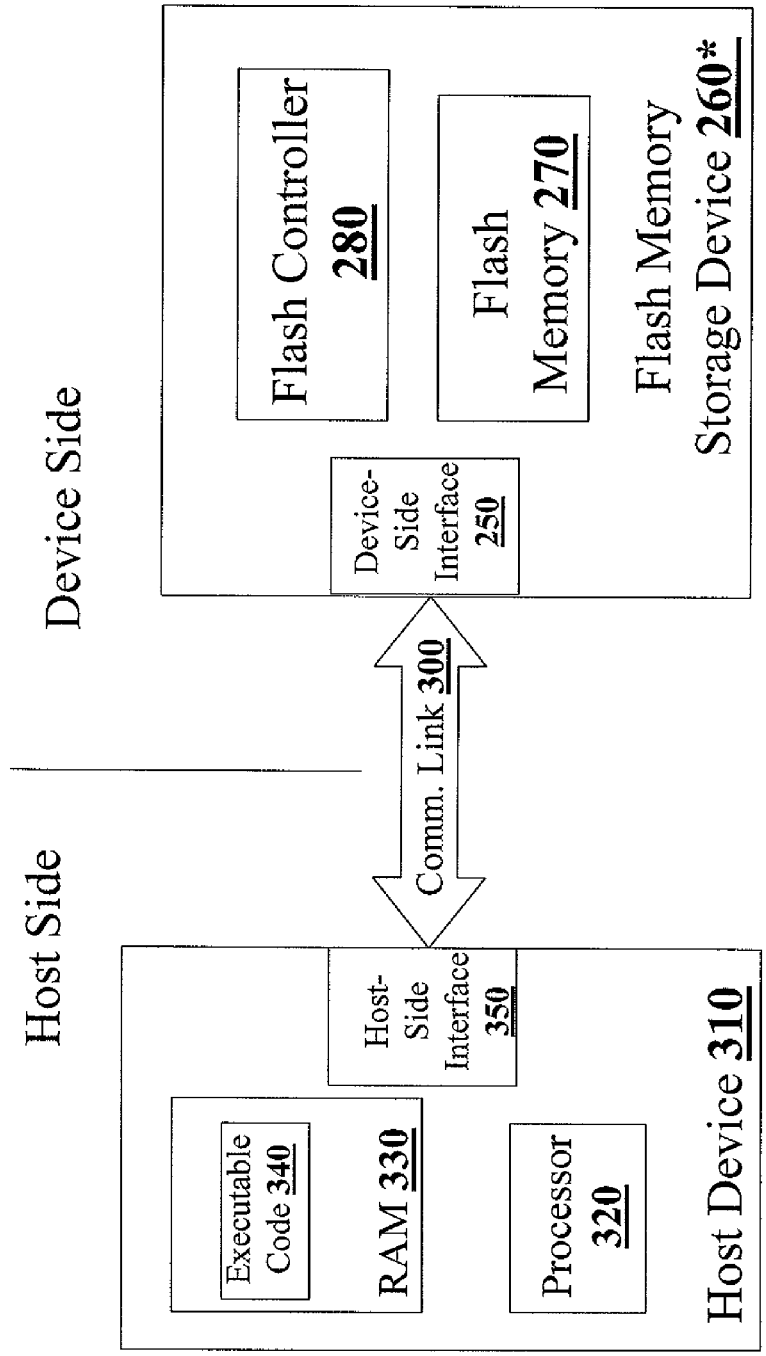
FIG. 1B is a block diagram of a conventional peripheral flash memory storage device that is coupled with a host device.
Figure 1C:
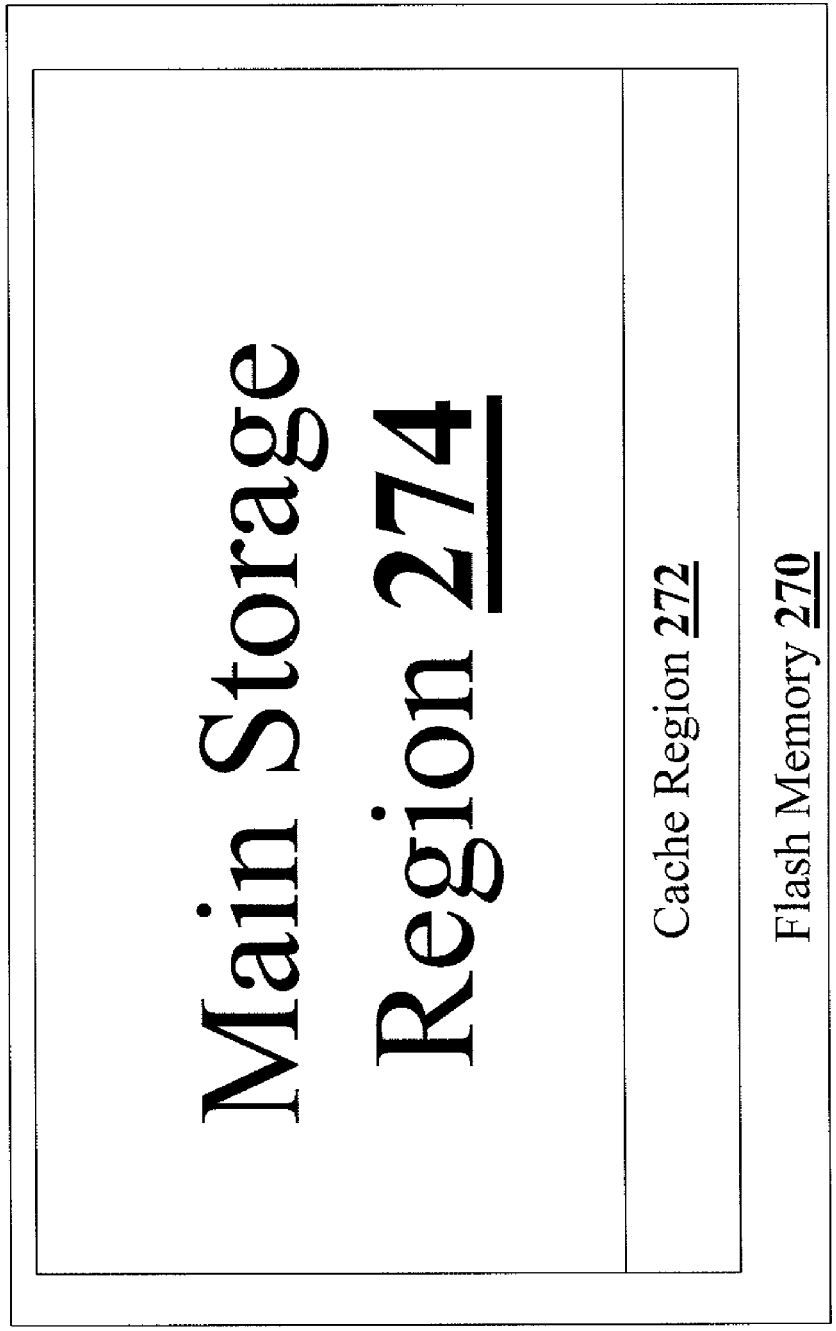
FIG. 1C is a block diagram of a conventional flash memory that includes a main storage region and a cache region.

In one example, the original data is copied, in step S411, from volatile memory (for example, RAM and/or register(s) and/or any other type of volatile memory) into non-volatile memory such as flash memory or magnetic 'disk' storage. In one particular example related to FIG. 1B, data is received by peripheral storage device 260* from a host device 310. In response to the data-receiving, the 'incoming' received data is written, in step S411, into non-volatile memory 270 within peripheral storage device 260*. Although several examples described in the present disclosure relate to implementation by a peripheral storage device 260*, it is appreciated that this is not a limitation whatsoever, and that any disclosed technique may be implemented using a memory storage device 260 that is not a peripheral storage device 260*.

In yet another example, the original data is copied, in step S411, from one location in volatile memory (for example, one location in RAM) to another 'target' location in the same volatile memory (for example, another location in RAM). In yet another example, the original data is copied from one type of volatile memory (for example, a register) into another type of volatile memory (for example, RAM).

In step S415, a 'first read operation' is carried out. In one non-limiting example, data is read back from the 'destination location' within the target memory to which the 'original' data was written in step S411. The read-back data (i.e. from the first read operation of step S415) is then compared, directly or indirectly, in step S419, to the 'original data.'

In various embodiments, the data comparing of step S419 may be useful for generating information indicative of the 'quality' of the data that resides in the 'target memory' (or alternatively, indicative of the 'quality' of the target memory itself) as a result of the write operation of step S411. Exemplary indicators of 'data quality' information include but are not limited to: i) a number of bit errors in the first read data; ii) a number of memory cells that contains erroneous data; iii) a list of one or more bit locations in which erroneous data is stored; iv) a list of one or more memory cells in which erroneous data is stored; and v) a value of a probability that a particular bit or plurality of bits in the first read data is erroneous.

This quality information may be stored and retrieved for later use. As will be explained below, this quality information may be used later in step S427 when correcting errors. In one non-limiting example, this quality information is determined and stored at programming time (i.e. at the time of step S419 or 'immediately after'—i.e. within a few seconds) and then used later. Nevertheless, as noted above, there is no explicit requirement to determine this information (i.e. in steps S415 and/or S419) at 'programming time'—this may be carried out at any time.

In some embodiments, the reading of step S415 and/or the comparing of step S419 is (i) carried out by storage device 260* 'automatically' and 'as a consequence' of the writing of step S411, (ii) does not require the receipt of any external 'data read request' from host device 310 and (iii) is not carried out in response to any 'data read request' received from the host device. Furthermore, in some embodiments, the first read data generated by the first read operation of step S419 may be for 'internal use' within peripheral storage device 260* (i.e. in steps S419-S427) and is not "exported" from peripheral storage device 260*.

Instead, the reading of step S415 and/or the comparing of step S419 may be carried out 'in response to' the writing of step S411 and/or in response to an 'externally received' data-writing command received by flash memory storage device 260 from host device 310 via respective inter-device interfaces 250, 350.

As noted above, the 'quality information' may be stored (not shown in FIG. 2) and retrieved at a later time (storing and retrieving steps are not shown in FIG. 2. The storing and/or retrieving may be carried out at any time, including before, concomitant with, after the reading of step S423.

In step S423, data is read from the memory in a 'second read operation.' In some embodiments, in contrast to the reading of step S415, the 'second read operation' may be carried out in a response to an externally-received 'data-read' command received by flash memory storage device, and the results of the data read in step S423 (either before or after the error correcting of step S427) may be 'exported' from memory storage device 260\* to a host device.

There is no limitation on the 'target location' of the reading of steps S415 and/or S423. In some embodiments, the 'target location' of the 'first reading' of step S415 and/or the 'second reading' of step S423 is the 'target location' to which the 'original data' was written in step S411.

In step S427, it is desired to correct errors in the 'second read data' read in step S423. In step S427, the error correction is carried in accordance with information obtained in step S419—i.e. in accordance with the results of the comparing of the first read data to the original data. Different examples of how to 'correct errors in accordance with the results of the comparing' are discussed below—for example, with reference to FIGS. 5-8.

Reading Back "Immediately"

Although not a limitation, it is noted that in some embodiments, the reading of step S415 and/or the comparing of step S419 is carried out 'immediately after' the writing of step S411 (for example, within a few seconds). This may be useful to 'free up' the location in memory in which the original data is stored.

Thus, in one non-limiting example 'original' data resides in volatile memory (not shown) within flash memory storage device 260—for example, but not limited to, volatile memory (e.g. RAM and/or register(s)) within flash controller 280. According to this example, in step S411, this 'original data' is written from the volatile memory to the flash memory 270—i.e. the volatile memory is the 'source memory' and the flash memory is the 'target memory.' According to this example, by reading back S415 and/or comparing S419 'immediately' (for example, within a few seconds), there is no need to maintain the 'original data' in the volatile memory and to "keep space reserved" within the volatile memory for the 'original data.' Thus, in this non-limiting example, after the comparing of step S419, it is possible to use the volatile memory (i.e. the location(s) in volatile memory) in which the 'original data' resides for other purposes.

Nevertheless, this is not a limitation, and it is certainly possible to effect the comparing at any time after the writing of step S411.

Figure 3:
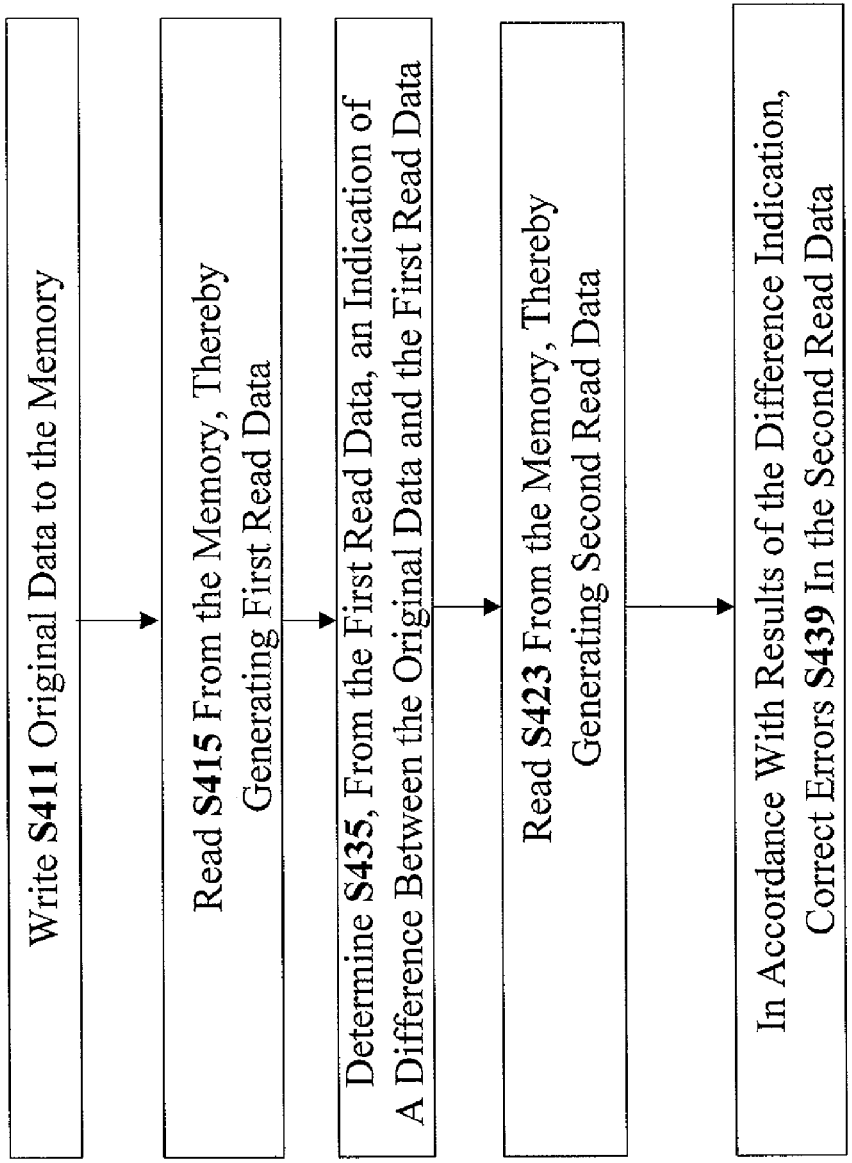

A Discussion of FIG. 3

It is noted that in some embodiments, the comparing of FIG. 2 is useful for determining an indication of a difference between the original data and the first read data (i.e. to which the original data is compared).

Reference is now made to FIG. 3. Steps S411, S415 and S423 of FIG. 3 may be implemented as in FIG. 2. In step S435, an indication of a difference between the original data and the first read data (for example, indicating how many errors are in the data residing in the 'target' memory to which original data was written in step S411) is determined.

In one example, this indication is determined by comparing the first read data and the original data.

Alternatively or additionally, the indication may be determined without comparing the first read data and the original data. In one example, errors are corrected in the first read data, and the error-corrected data is compared (i.e. directly or indirectly) to the first read data. If, for example, the error-corrected data is identical or close to the first read data, this may indicate that few or no errors exist in data that resides in the 'target memory.' This could indicate that the 'difference between the original data and the first read data' is non-existent or minimal. On the other hand, more differences between the error-corrected data and the first read data may indicate that the 'data writing' process of step S411 was 'noisy' (for example, due to program disturb effects) and the difference between the original data and the first read data is relatively 'large.'

In all of the aforementioned examples, the indication of the difference between the original data and the first read data is determined from the first read data that is read, in step S415 from the 'target memory'—for example, read in step S415 from a 'target location' within the 'target memory' to which the original data is written in step S411.

A Number of Exemplary Use Cases Relating to What Kind of Information Indicative of Difference(s) Between the Original Data and the Data Read (i.e. in Step S435) May be Stored It is appreciated that the list of examples provided is not intended as an exhaustive list. Furthermore, it is appreciated that in different implementations, various combinations are possible. All examples are intended as illustrative rather than as limiting.

A First Example

In a first example of the present section, the exact locations of the errors in the first data (i.e. as determined in steps S419 and/or S435) are stored, so that at reading time the flash controller or any other element of a memory storage system can easily correct the listed erroneous bits. In one particular implementation, the number of erroneous locations that are stored is limited to a maximum number—this may simplify the management of the storage of the errors or 'quality' information determined in step S419 and/or S435 and/or S463.

A Second Example

In some embodiments, a value or values that are derived from the known erroneous data are stored, while the description(s) of the location(s) of the error(s) are not stored. For example, the number of errors may be stored without storing their location. As is explained below, such a value may be useful in enhancing the error correction process in some error correction schemes.

A Third Example

When using MLC flash devices, either data bits or flash cells may be considered the basic units. So when storing exact locations, one may either identify specific bits and/or identify specific cells. Thus, in different non-limiting examples, when storing number of errors, one may either store a number of erroneous bits and/or number of erroneous cells.

According to one embodiment where exact locations of erroneous bits are stored, it may be very simple to use the stored location(s) to advantage when reading the user data. In particular examples, the error correction process may then be implemented as a two-phase process—first the indicated erroneous bits are inverted, and then the regular error correction scheme is employed. This may work with any type of error correction scheme.

A Number of Exemplary Use Cases Relating to "Storing and Retrieving Information Indicative of Errors in Data Read-Back from the 'Target' Memory In Step S415

As noted above, in some embodiments the information generated from the comparing of step S419 and/or from the determining of step S435 is first stored (step not illustrated in the FIGS), and later retrieved for use in step S427 and/or step S439. There is no limitation on how and/or where the generated information is stored. The generated information may be stored in any combination of volatile and/or non-volatile memory.

In some embodiments, the generated information is stored in the 'target memory' to which the original data is written in step S411. Alternatively or additionally, the generated information may be stored in a memory other than the target memory.

Some non-limiting use cases relating to the specific case of a flash memory device that includes (i) a controller 280 which resides on a first die; and (ii) a flash memory 270 (for example, NAND flash) which resides on a second die different from the first die (or on multiple dies different from the first 'controller' die) are now discussed.

Use Case A. The information is stored in the NAND flash die. After effecting each comparison operation (for example, see step S419) the flash controller stores the information in the flash die. The information may be attached to the user data it is related to, for example residing in the extra area of the page containing the data. Alternatively, the information of many pages may be combined into a central location, such as a table of entries containing the relevant information for multiple pages.

In some implementations, the second alternative may be preferable because (i) the information may only be known after the user data was already stored into the flash page, and (ii) doing a second write operation into that page might violate the Partial Programming limitation of the flash device. In this implementation the controller may need to retrieve the stored information when (or before) the controller needs the stored information (for example, in step S429 or S439). In various implementations, the controller 280 may do this retrieving either before reading the user data (i.e. in the second read operation of step S423) or after reading the user data. In some embodiments, it may be preferable for the controller to retrieve this information before the decoding of the user data so as to be able to use it in the decoding process.

Use Case B: According to this use case, the information is stored in the controller die rather than in the flash memory die.

Figure 4:
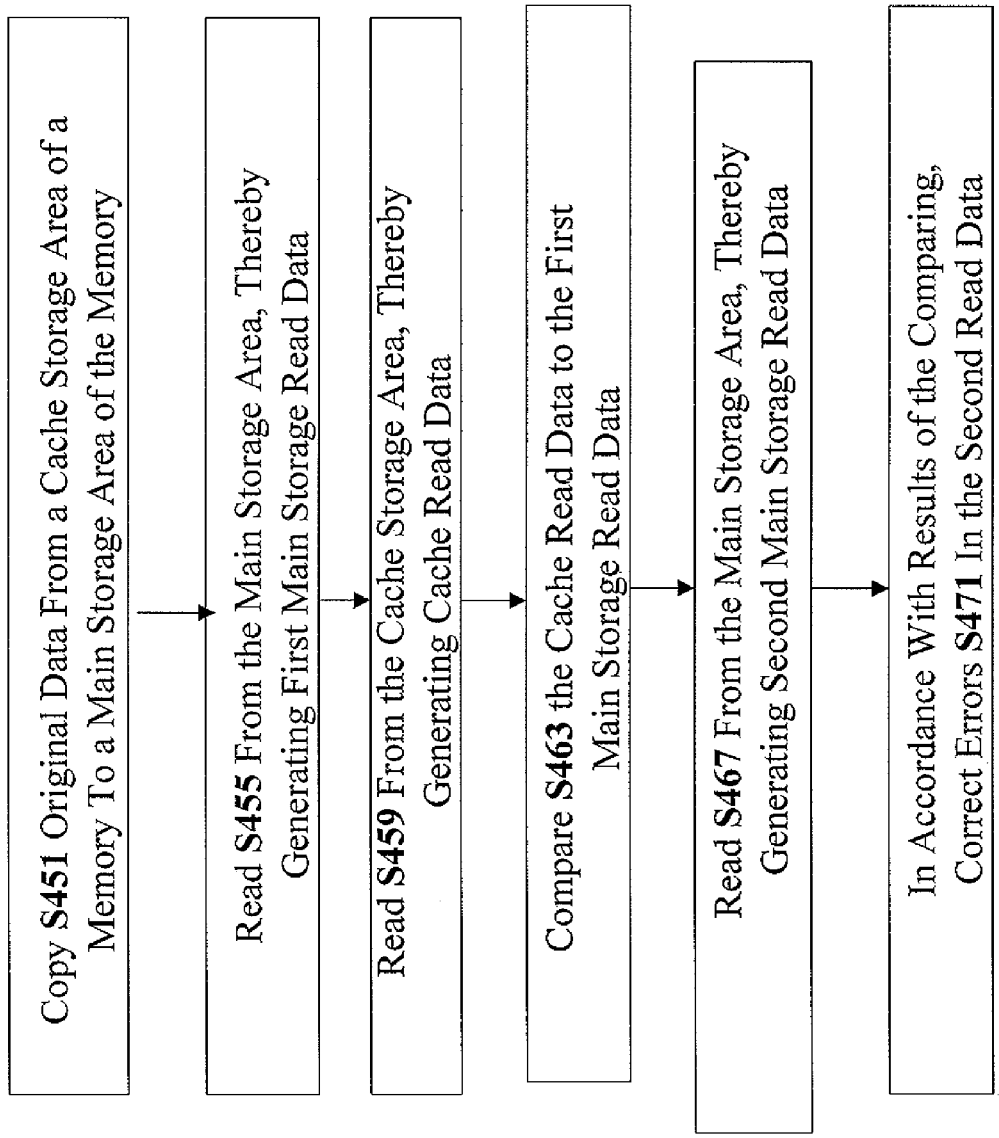

A Discussion of FIG. 4

FIG. 4 is a flowchart of a routine for handling error correction in accordance with some embodiments. In step S451, original data is copied from a cache storage area 272 (for example, a cache storage area 272 of a flash memory 270) to a main storage area (for example, a main storage area of 274 of a flash memory 270). It is noted that due to potential errors when programming the main storage area 274 there is no guarantee that, after the copying operation of step S451, the actual data residing in the main storage area 274 will be identical to the data copied from the cache storage area 272—for example, due to program disturb effects.

In step S455, data is read from the main storage area 274, for example into volatile memory, to generate 'first main storage read data.' In one example, the data read operation of step S455 includes reading from the 'target location' within the main storage area 274 to which data was copied in step S451.

In step S459, data is read from the cache storage area 272, for example into volatile memory, to generate 'cache read data.' In one example, the data read operation of step S459 includes reading from the 'source location' in the cache 272 from which data is copied in step S451.

In step S463, the cache read data (i.e. which may be understood as 'analogous to' original data) is compared with the first main storage read data (i.e. which may be understood as 'analogous to' first read data). In some embodiments, this comparison of step S463 provides an indication of a difference between the cache read data and the first main storage read data which may be useful for determining how 'successful' (or not) was the copying and/or an existence or absence of program-time errors in the main-area-residing data that was the 'target' of copy operation of step S451. Similar to the comparing of step S419, the comparing of step S463 may be implemented as a 'direct comparison' and/or an 'indirect comparison'—the skilled artisan is referred to the FIG. 10.

In step S467, a 'second reading' of the main storage area 274 is carried out. In some embodiments, this 'second reading' may be carried out in accordance with or in response to a received 'external read command' received by storage device 260 from host device 310.

In step S471, errors are corrected in the 'second main storage read data' in accordance with the results of the comparing of step S463. In one example, if the comparing of step S463 indicates that the main storage read data is identical or nearly identical to the cache read data (i.e. indicating that the copying event of step S451 was relatively 'successful'), then a relatively 'optimistic' error correcting routine is used in step S71. Otherwise, if the comparing of step S463 indicates that the main storage read data is different from the cache read data, then a less 'optimistic' error correcting routine or a 'pessimistic' error correcting routine may be used.

Non-limiting examples of 'optimistic' and 'pessimistic' error correction routines are discussed below with reference to FIGS. 5-8.

In one use case, it is possible to, "indirectly" write "target" data from volatile memory to the main storage region 278 via cache storage region 272. In this use case, cache region 272 is a 'more reliable storage medium' than the main storage region 274, and it is assumed that; (i) it is unlikely that data written to the cache 272 includes errors; (ii) it is more likely that data copied (i.e. in step S451) to the main storage area 274 includes errors. Because the data in cache 272 is assumed to be relatively 'error-free,' there is no need to maintain the 'original data' in volatile memory while processing the data read back from the main storage region 278—instead, it is possible to utilized data read back from the 'relatively reliable' cache region 272.

A Discussion of Exemplary Implementations of Steps S427 and/or S471 and/or S439 With Reference to FIGS. 5A-5B, 6A-6D Consider two decoders (or one decoder capable of operating in two different modes) with the following characteristics:

a. The first decoder is faster and/or is "lighter weight", but on the other hand is not guaranteed to succeed in producing the result of the decoding process.

b. The second decoder is slower and/or is "heavier weight", but is guaranteed to always produce the correct result of the decoding process (or at least is more likely to produce the correct result of the decoding process).

Typically, the higher the number of errors in the data, the more frequently the first decoder fails. Unfortunately, upon reading back data from the memory (for example, by reading back the representation of the codeword) in steps S423 or S467, it is not always known a-priori how many errors are in the read-back data. Thus, it is not always known whether or not a "heavier weight" decoder (or heavier weight mode of a single decoder) is required, or a "lighter weight" decoder will suffice.

The present inventors are now disclosing that in the event that (i) the comparing of steps S419 (or step S463) or (ii) the determining of step S435 indicates that the data writing of step S411 or the data copying of step S451 was relatively "successful" then a relatively "optimistic" technique for later correcting errors may be selected for correcting errors in the data read in steps S423 or S467. Thus, in this case, it may be advantageous to "risk" correcting errors using the "lighter weight" decoder (or lighter weight mode of a single decoder). Otherwise, it may be preferable to correct errors using the "heaver weight" decoder or heavier weight mode of a single decoder.

Figure 5A:
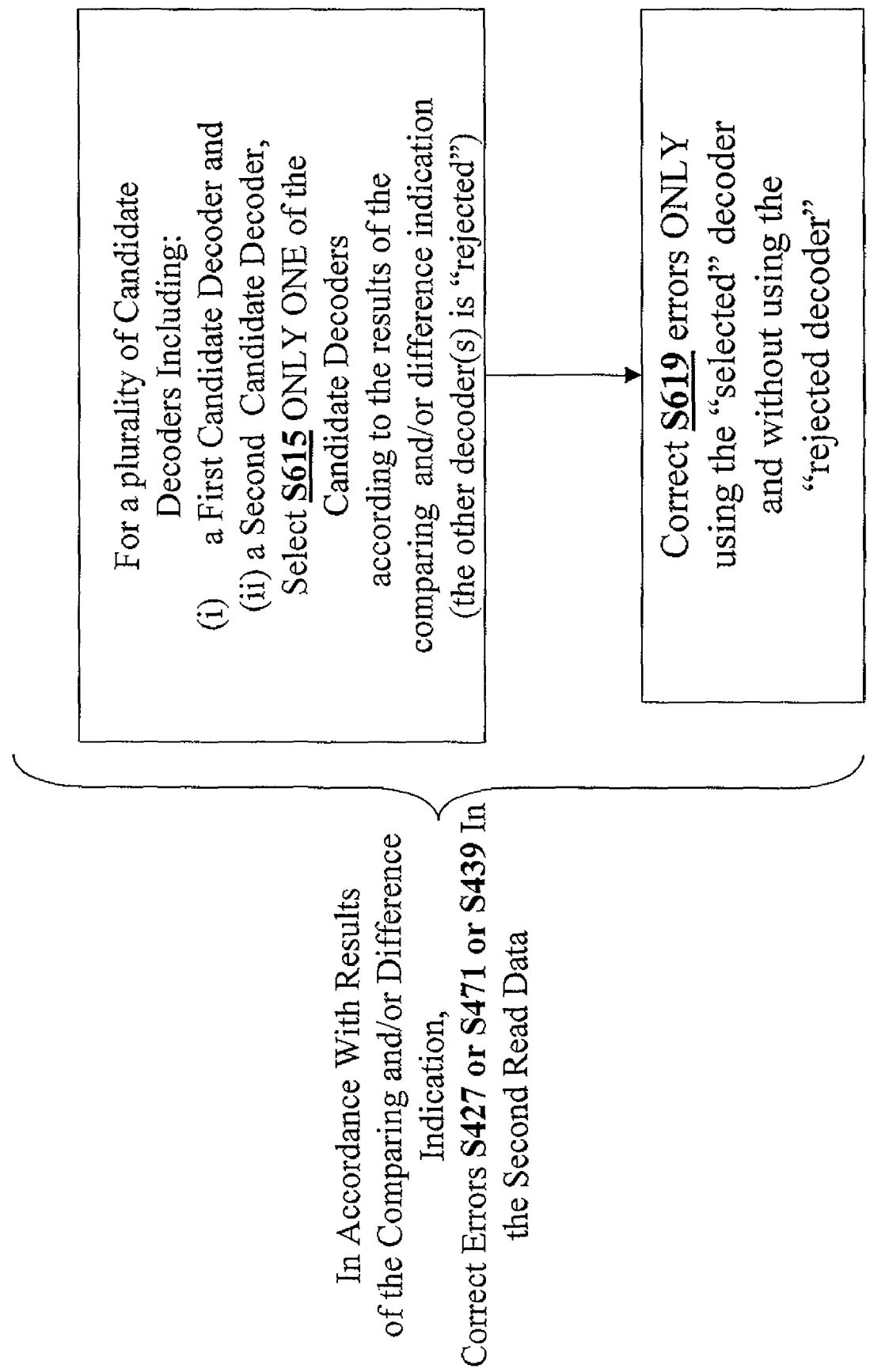

Reference is now made to FIG. 5A. In step S615, a decoder is selected from a plurality of candidate decoders in accordance with results of the comparing and/or difference indication.

In step S619, errors are corrected only using the selected decoder and without using the unselected "rejected" decoder.

Figure 5B:
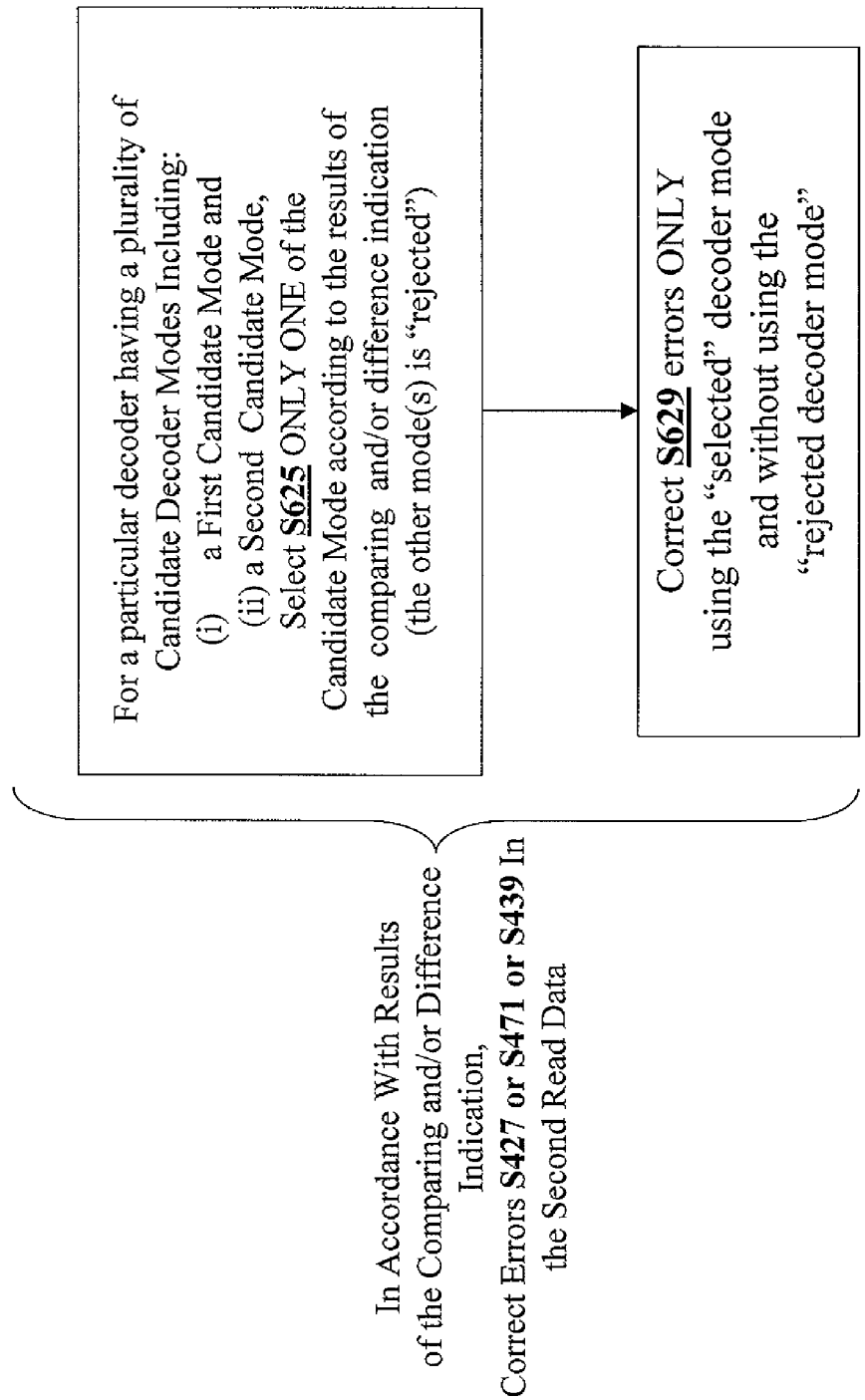

Reference is now made to FIG. 5B. In step S625, a mode of a given decoder is selected from a plurality of candidate decoder modes in accordance with results of the comparing and/or a difference indication as determined in steps S419 or S435 or S463.

In step S629, errors are corrected only using the selected decoder mode and without using the unselected "rejected" decoder mode.

Reference is now made to FIG. 6A.

In step S651, a decision is made whether or not to attempt to correct errors using a lighter-weight decoder (i.e. of a plurality of candidate decoders) according to results of the comparing and/or a difference indication as determined in steps S419 or S435 or S463.

In the event that the results of the comparing and/or a difference indication as determined in steps S419 or S435 or S463 are indicative that the writing of step S411 or the copying of step S451 was relatively 'successful' (for example, because the first read data is 'highly similar' to the original data, or because the first main storage read data is 'highly similar' to the cache read data), then a relatively "optimistic" error correction strategy may be adopted. Thus, in this scenario, an attempt is made in step S655 to correct errors using the lighter-weight decoder. If the lighter-weight decoder succeeds (see step S659) there is no need to attempt to correct errors using the heavier weight decoder (see step S667). If the lighter-weight decoder fails to correct errors, an attempt is then made S663 to correct errors using a heavier-weight decoder.

Furthermore, it is noted, with reference to step S651, that in the event that the results of the comparing and/or a difference indication as determined in steps S419 or S435 or S463 are indicative that the writing of step S411 or the copying of step S451 was relatively 'less successful' (for example, because the first read data is 'relatively different' from the original data, or because the first main storage read data is relatively 'different from' to the cache read data), then a relatively "pessimistic" error correction strategy may be adopted. In this scenario, it is possible to skip step S665, and to attempt to correct errors (in step S663) using the heavier weight decoder rather than the lighter weight decoder.

Figure 6B:
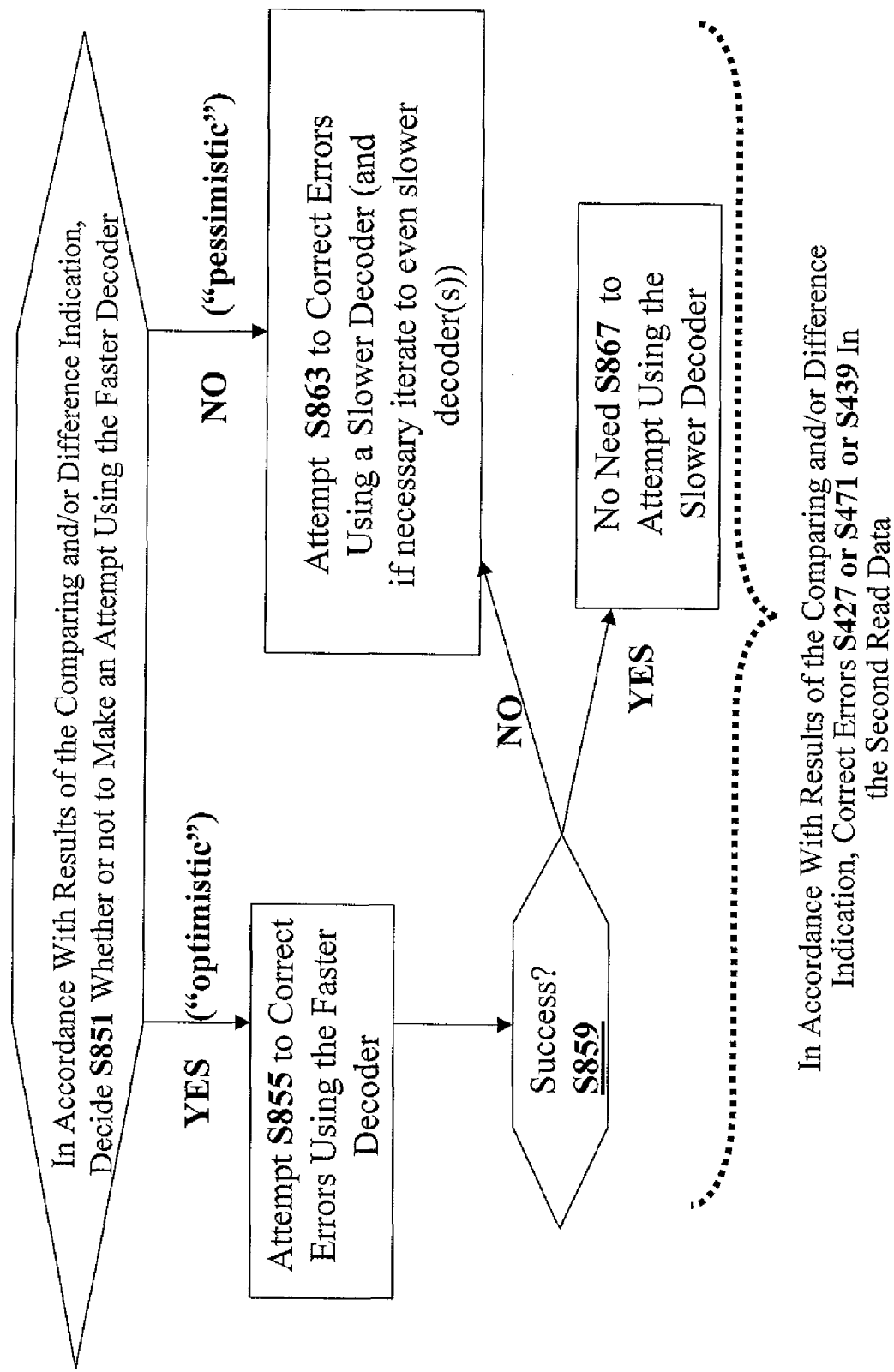

Reference is now made to FIG. 6B.

In step S851, a decision is made whether or not to attempt to correct errors using a faster decoder (i.e. of a plurality of candidate decoders) in accordance with results of the comparing and/or a difference indication as determined in steps S419 or S435 or S463.

In the event that the results of the comparing and/or a difference indication as determined in steps S419 or S435 or S463 indicate that a relatively "optimistic" error correction strategy may be adopted, an attempt is made in step S855 to correct errors using the faster decoder. If the faster decoder succeeds (see step S859) there is no need to attempt to correct errors using the slower decoder (see step S867). If the faster decoder fails to correct errors, an attempt is then made S863 to correct errors using a slower decoder.

Furthermore, it is noted, with reference to step S851, that in the event that the results of the comparing and/or a difference indication as determined in steps S419 or S435 or S463 indicate that a relatively "pessimistic" error correction strategy is preferable, that it is possible to skip step S865, and to attempt to correct errors (in step S863) using the slower decoder rather than the faster decoder.

Figure 6C:
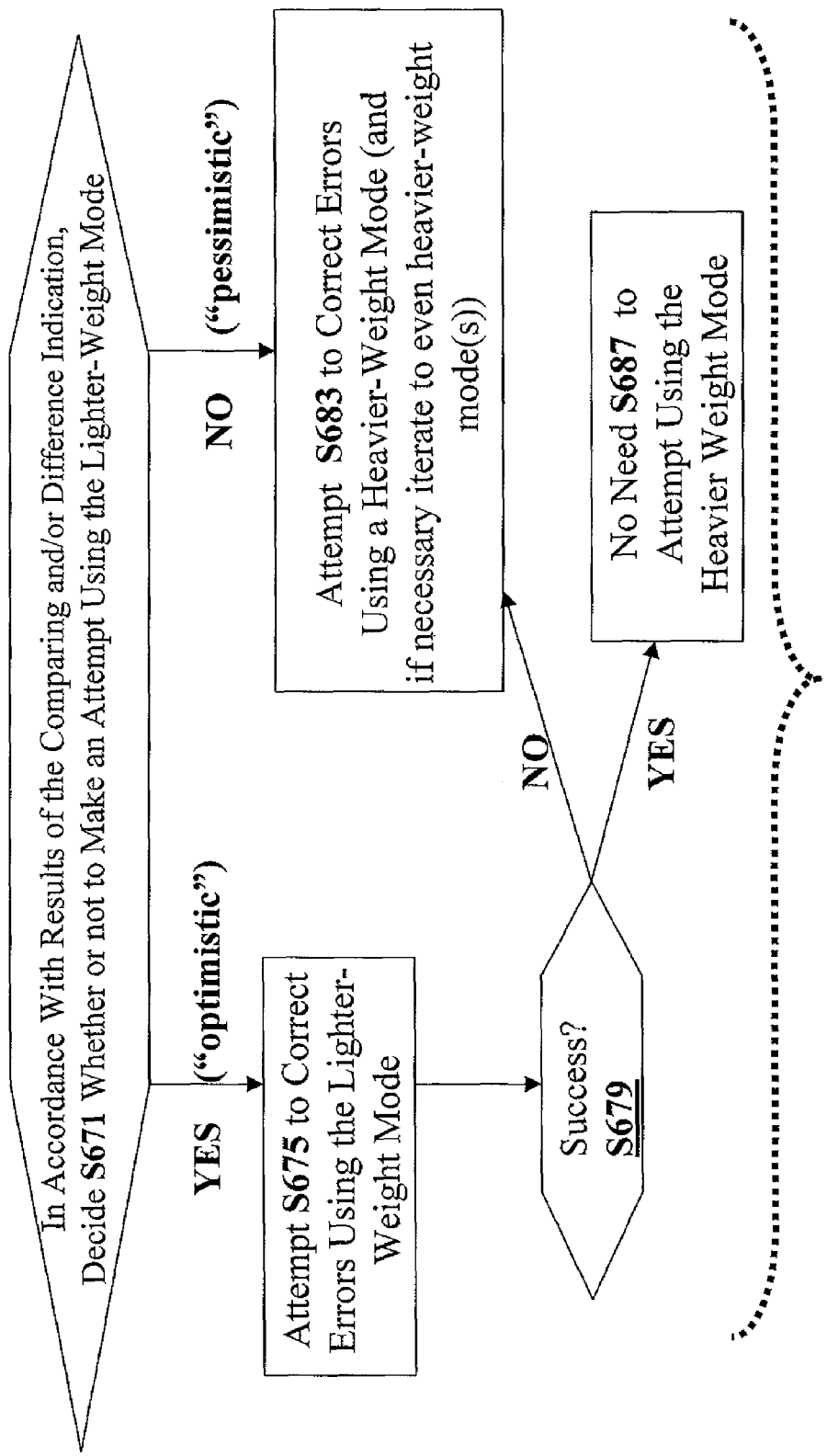

Reference is now made to FIG. 6C.

In step S671, a decision is made whether or not to attempt to correct errors using a lighter-weight mode (i.e. of a plurality of candidate decoder modes for a given decoder) in accordance with the results of the comparing and/or a difference indication as determined in steps S419 or S435 or S463 In the event that the results of the comparing and/or a difference indication as determined in steps S419 or S435 or S463 indicate that a relatively "optimistic" error correction strategy may be adopted, an attempt is made in step S675 to correct errors using the lighter-weight mode. If the lighter-weight mode succeeds (see step S679) there is no need to attempt to correct errors using the heavier weight mode (see step S687). If the lighter-weight mode fails to correct errors, an attempt is then made S683 to correct errors using a heavier-weight mode.

Furthermore, it is noted, with reference to step S671, that in the event that results of the comparing and/or a difference indication as determined in steps S419 or S435 or S463 indicate that a relatively "pessimistic" error correction strategy is preferable, that it is possible to skip step S675, and to attempt to correct errors (in step S683) using the heavier weight mode rather than the lighter weight mode.

Figure 6D:
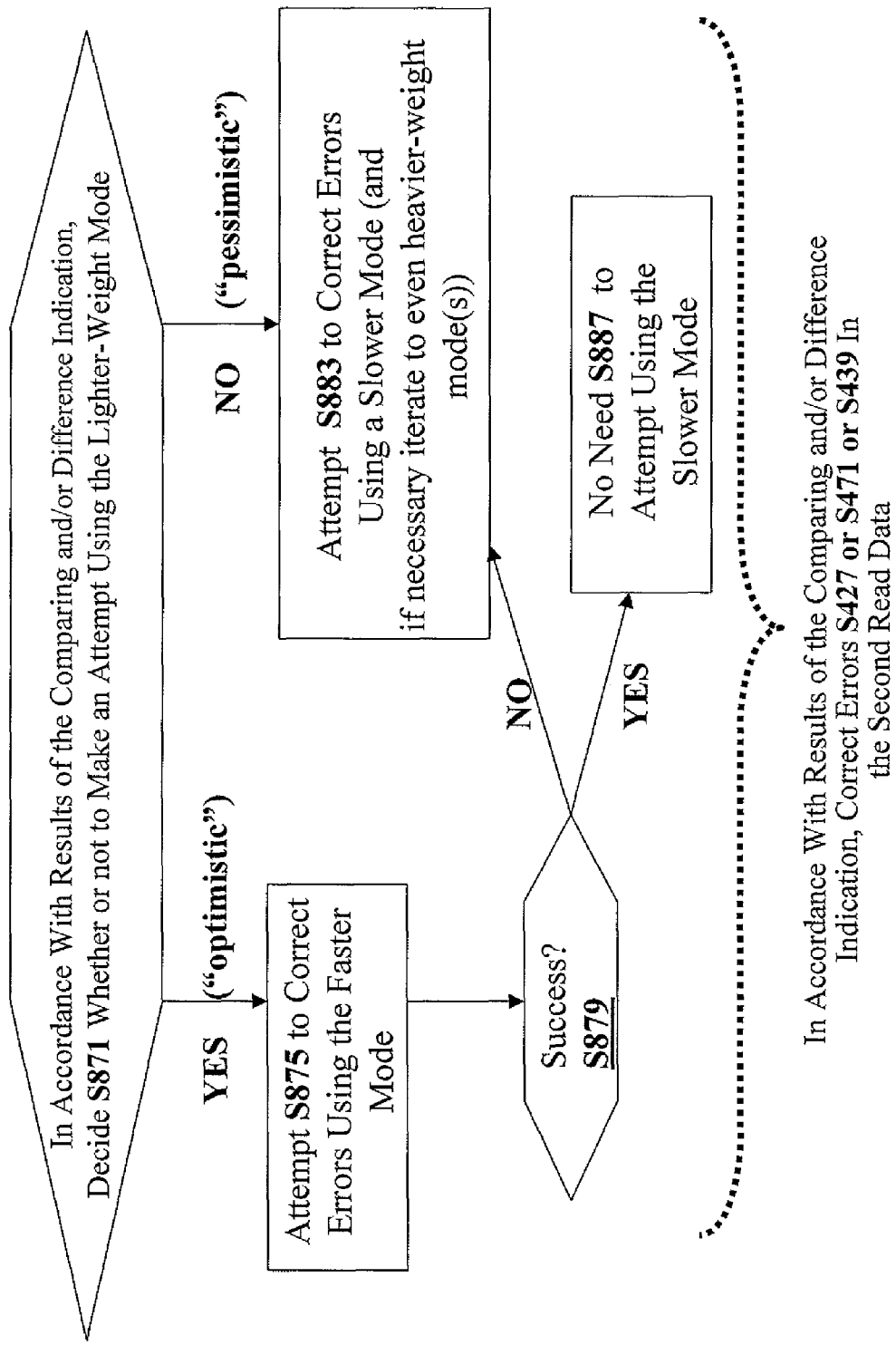

Reference is now made to FIG. 6D.

In step S871, a decision is made whether or not to attempt to correct errors using a faster decoder mode (i.e. of a plurality of candidate decoder modes) in accordance with results of the comparing and/or a difference indication as determined in steps S419 or S435 or S463.

In the event that the results of the comparing and/or a difference indication as determined in steps S419 or S435 or S463 indicate that a relatively "optimistic" error correction strategy may be adopted, an attempt is made in step S875 to correct errors using the faster decoder mode. If the faster decoder succeeds mode (see step S879) there is no need to attempt to correct errors using the slower decoder mode (see step S887). If the faster decoder mode fails to correct errors, an attempt is then made S883 to correct errors using a slower decoder mode.

Furthermore, it is noted, with reference to step S871, that in the event that results of the comparing and/or a difference indication as determined in steps S419 or S435 or S463 indicate that a relatively "pessimistic" error correction strategy is preferable, that it is possible to skip step S865, and to attempt to correct errors (in step S863) using the slower decoder mode rather than the faster decoder mode.

Figure 7:
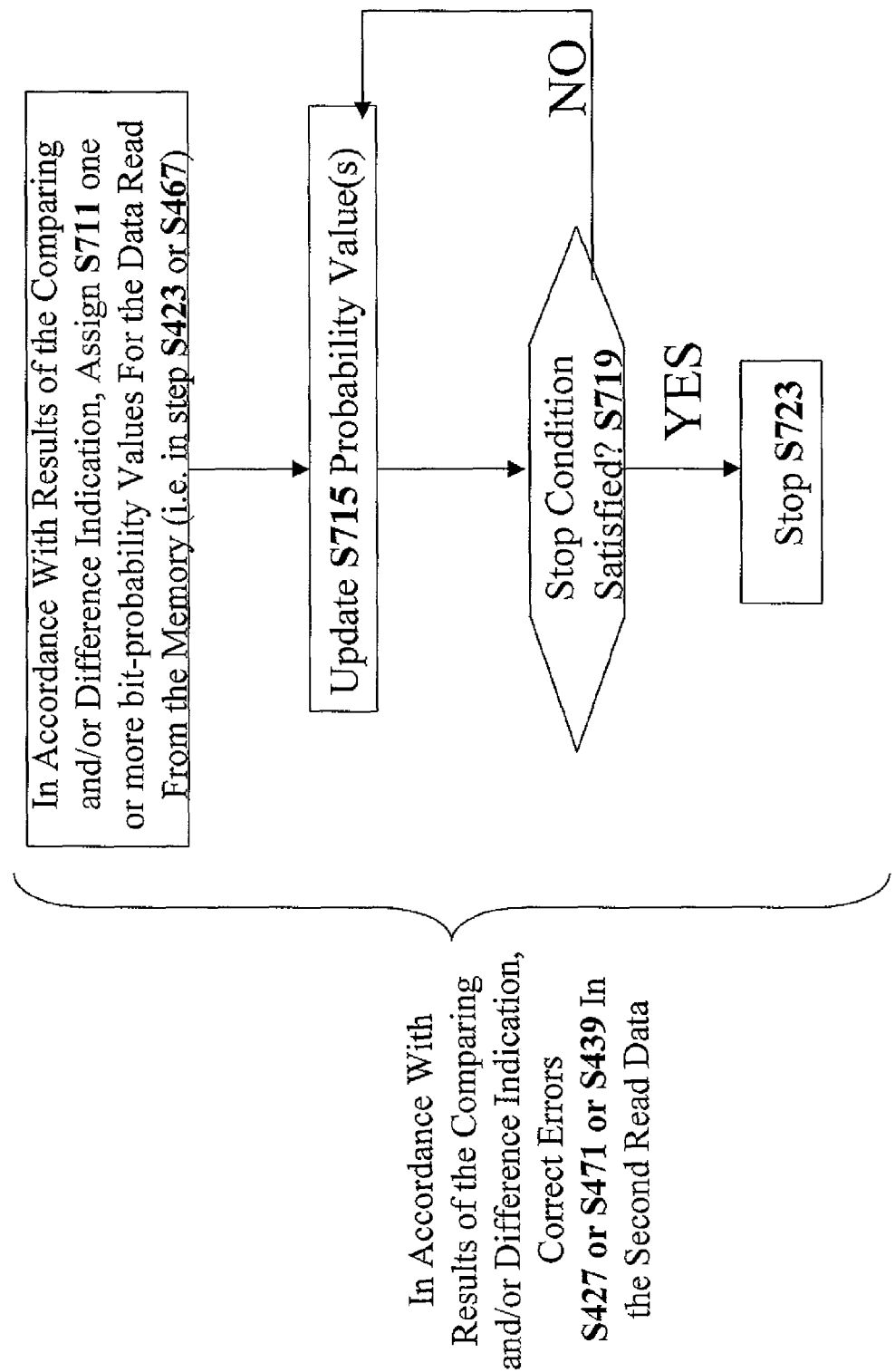
Figure 8:
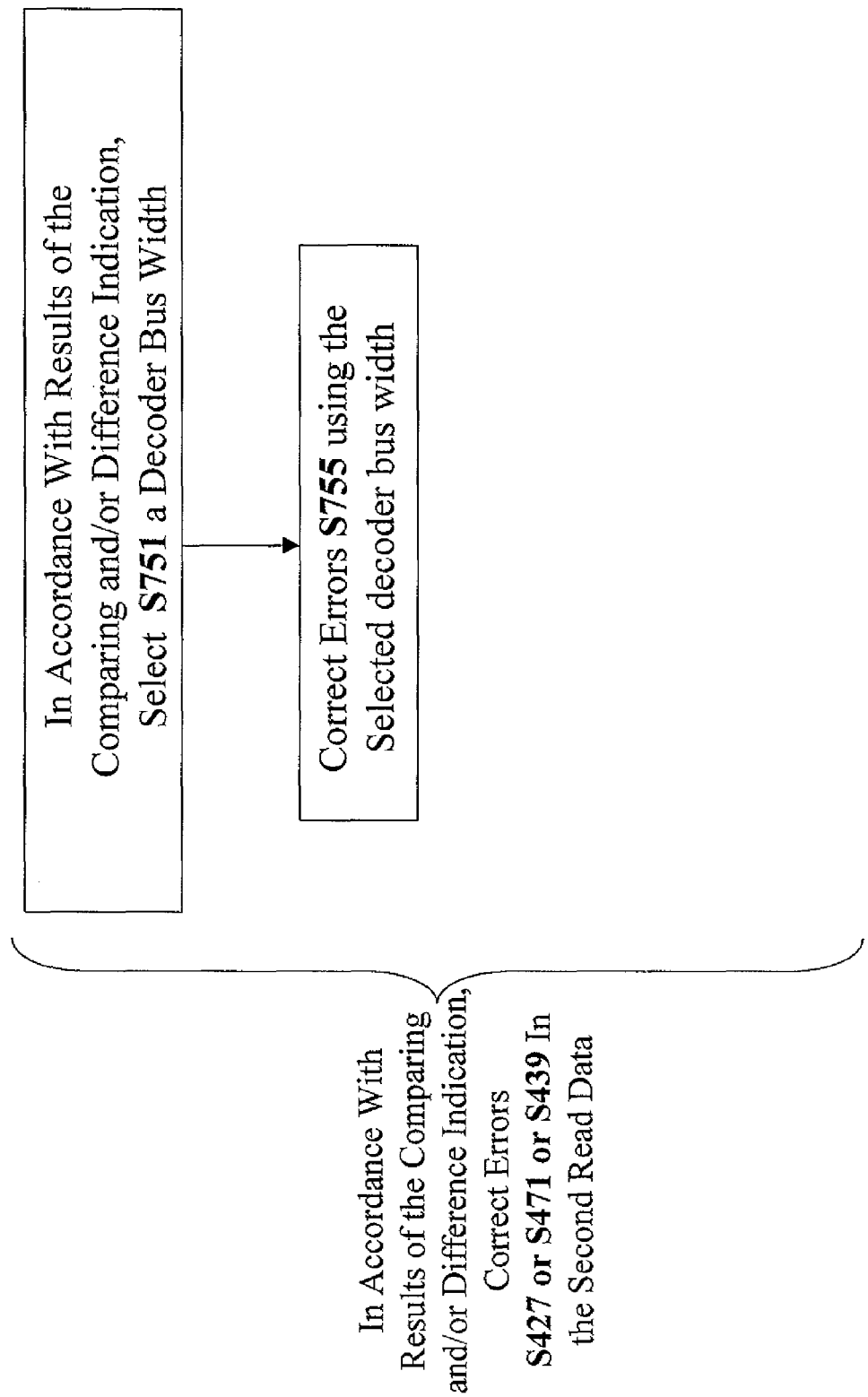

A Discussion of FIGS. 7-8

FIGS. 7-8 are flow charts of techniques for correcting errors in accordance with results of the comparing and/or difference indication using a soft decoder.

Soft decoders operate by assigning a probability to each bit of the codeword (e.g. the probability that the value of the bit is 1 and not 0), and running multiple iterations in each of which the probability of each bit is changed according to the current probabilities of other bits.

Any decoder that is not a soft decoder is herein called "an algebraic decoder".

In step S711, one or more bit-probability values are assigned in accordance with results of the comparing and/or difference indication.

For the present disclosure, a "bit-probability value" is defined as a probability that a specified bit has a specified value—for example, 0 or 1.

In one non-limiting example relating to systematic decoders, bits corresponding to the original data are read from the memory in step S423 or S467. In this example, one or more of the read-back bits may be flipped—for each bit, a respective probability that the bit is "flipped" is initially assigned. In the event that the probability that a given bit is "flipped" is initially assigned "higher" than necessary or "lower" than necessary, the iterative probabilistic error correction routine may converge "unnecessarily slow" (i.e. in terms of computation steps or resources required and/or amount of time needed to converge).

Thus, in one non-limiting use case, in the event that the "results of the comparing and/or a difference indication as determined in steps S419 or S435 or S463" indicate an "optimistic situation," it is possible to assign appropriate initial probability indicative of a lower probability of bit flipping—this could "help" the iterative probabilistic error correction routine converge faster. In the event that the value of the results of the comparing and/or a difference indication as determined in steps S419 or S435 or S463 indicate a "pessimistic situation," it is possible to assign appropriate initial probability indicative of a higher probability of bit flipping.

In steps S715 and S719 the iterative routine is carried out, where the probabilities are updated (see step S715) until a "stop condition" is satisfied in step S719 (for example, until a determination is made that the "original" data was "correctly" recovered). In step S723, the routine stops.

Reference is now made to FIG. 8.

As noted above, soft decoders operate by assigning a probability to each bit of the codeword (e.g. the probability that the value of the bit is 1 and not 0), and running multiple iterations in each of which the probability of each bit is changed according to the current probabilities of other bits.

This type of calculation is said to employ "message passing" techniques, as each bit "passes messages" to its peers. A major design decision in implementing such decoders is the bus width of the message passing. Using a wide bus (for example 10 bits) assures that if the algorithm can cope with the errors, the algorithm will indeed converge to the correct data. But on the other hand, the power consumption of the decoder is high in such design. Using a narrow bus (for example 3 bits) provides much lower power consumption, but the decoder might fail to converge to the correct data in cases with relatively large number of errors (even if the same pattern of data and errors is correctly decoded in a corresponding wide bus decoder). The number of bits used for message passing has a major influence on the power consumption of the decoding process—the higher the number of bits, the higher the power consumption.

One of the reasons for this phenomenon is that the soft decoder's messages and channel inputs (soft values) are stored in a large-power-consuming RAM during the decoding operation. When for example we use 3 bits instead of 10 bits per message, 70% of the RAM can be shut down. Another source of power consumption saving is the processing units that process these passing messages. It is evident that performing computations on 3 bits instead of 10 bits requires smaller and less-power-consuming units.

It is possible to implement a soft decoder in which the number of bits in the "message passing" can be set at the beginning of the decoding. Thus, in some embodiments, a decoding bus width size is selected in accordance with results of the comparing and/or a difference indication as determined in steps S419 or S435 or S463. In the event that the results of the comparing and/or a difference indication as determined in steps S419 or S435 or S463 indicate an "optimistic situation," it is possible to select a smaller decoding bus width size and to correct errors accordingly. Otherwise, it may be preferable to select a larger decoding bus width size.

This is shown graphically in FIG. 8. In step S751, a decoder bus width is selected in accordance with results of the comparing and/or difference indication. In step S755, errors are corrected according to the selected value of the decoder bus width.

A Discussion of FIG. 9

In some embodiments, the comparing of step S419 and/or step S463 is a 'direct comparison' between the original data and the first read data and/or the cache read data first main storage read data.

Alternatively or additionally, the comparing of step S419 and/or step S463 is an 'indirect comparison' that involves a non-identity indicative function of at least one of the inputs to the comparison operation.

An 'indicative function' of data is a function whose result is indicative of and depends on the data, in contrast with, for example, a function whose result is constant or completely random/stochastic. A 'non-identity' function is a function other than an identity function—i.e. the result of the function differs from the 'input to the function.'

In one example, one or more of the non-identity indicative functions are explicitly computed. Alternatively, there is no need to explicitly compute one or more of the non-identity indicative functions. In one non-limiting example, the non-identity indicative function of the original data and/or first read data and/or cache read data and/or main storage read data may happen to reside in memory.

Reference is now made to FIG. 9A. In the example of FIG. 9A, it is possible in step S419, to compare the first read data to the original data either by: (i) effecting a direct comparison as in step S479; and/or (ii) by effecting a indirect comparison.

The indirect comparison may include any of the following direct comparisons:
  i) a direct comparison between the first read data and an indicative non-identity function of the original data (i.e. either an explicitly computed function or otherwise);
  ii) a direct comparison between an indicative non-identity function (i.e. either an explicitly computed function or otherwise); of the first read data and the original data; and
  iii) a direct comparison between an indicative non-identity function (i.e. either an explicitly computed function or otherwise); of the first read data and an indicative non-identity function (i.e. either an explicitly computed function or otherwise); of the original data;

In one example, the 'indicative non-identity function of the original data' is obtained by explicitly computing the function of the original data.

Figure 9B:
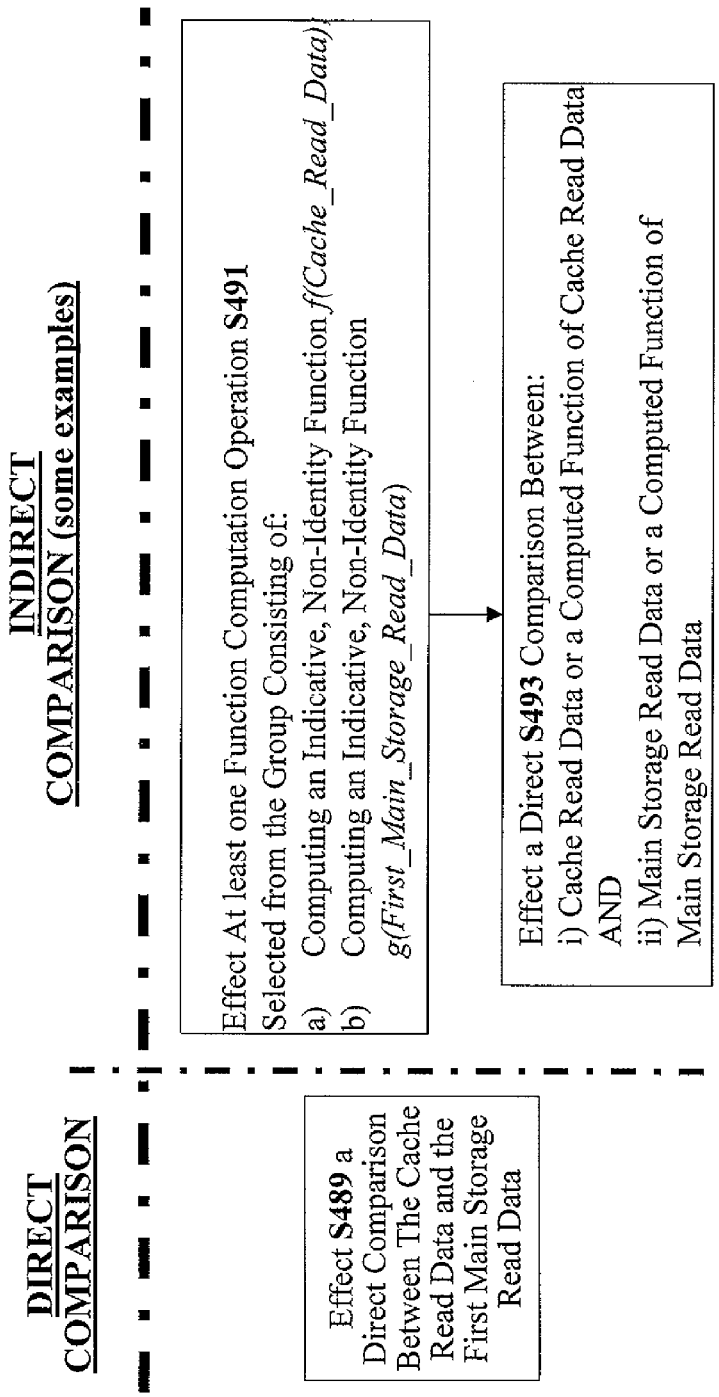

As illustrated in FIG. 9B, it is possible in step S463, to compare the first main storage read data to the cache read data either by: (i) effecting a direct comparison as in step S489; and/or (ii) by effecting a indirect comparison (e.g. as in steps S491, S493).

The indirect comparison may include any of the following direct comparisons
  i) a direct comparison between the first main storage read data and an indicative non-identity function of the cache read data;
  ii) a direct comparison between an indicative non-identity function (i.e. either an explicitly computed function or otherwise) of the first main storage data and the cache read data; and
  iii) a direct comparison between an indicative non-identity function (i.e. either an explicitly computed function or otherwise) of the first main storage read data and an indicative non-identity function (i.e. either an explicitly computed function or otherwise) of the cache read data.

Figure 10:
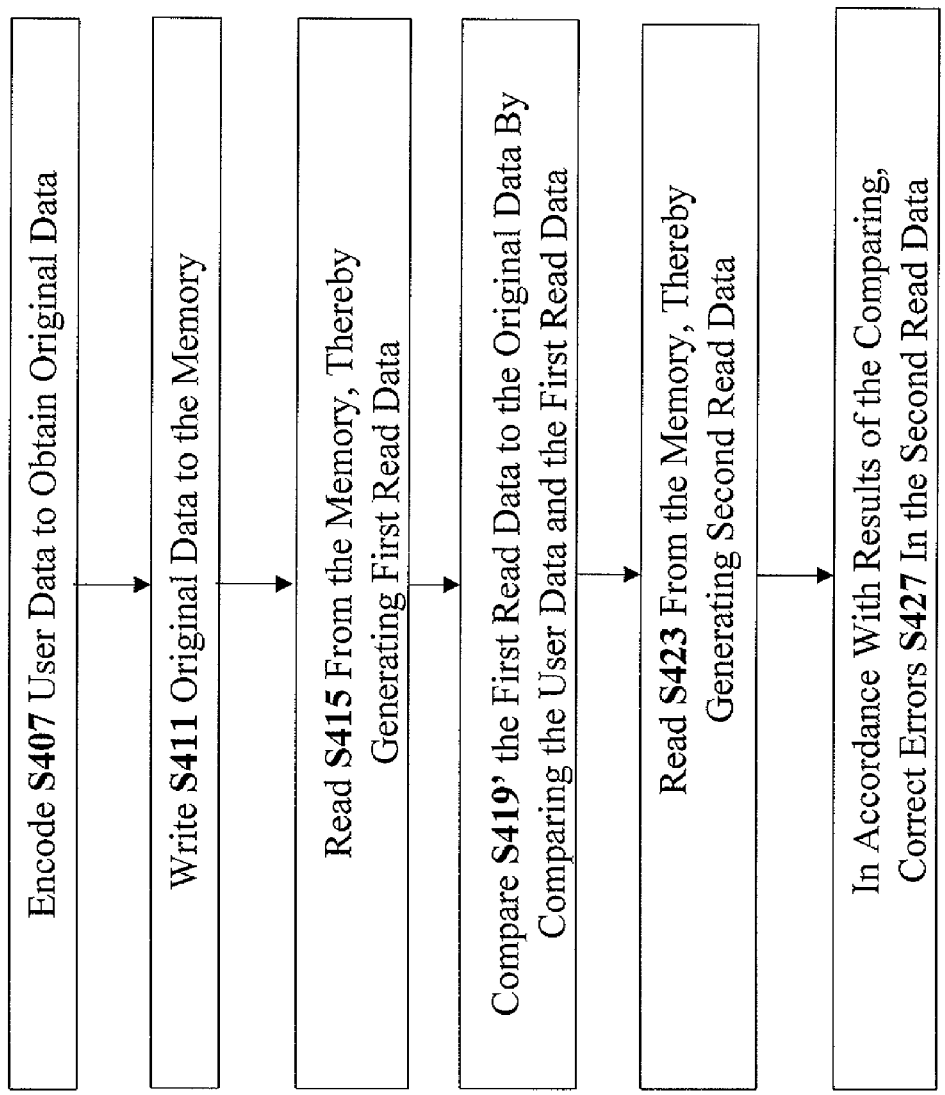

A Discussion of FIG. 10

FIG. 10 provides a flow chart of an exemplary routine for correcting errors. In step S407, user data is encoded to obtain original data. In one non-limiting example, "user data" is sent from host 310 to peripheral flash device 260*. In this example, peripheral flash device 260*, in accordance with 'nonsystematic error correction' techniques, encodes, in step S407, the user data into a codeword in which the identity of the 'user data' is not preserved. In this example, the 'codeword' is the original data for which an attempt is made, in step S411, to write to the 'target' memory (e.g. flash memory).

Step S415 of FIG. 10 is similar to step S415 of FIG. 3.

In step S419' a comparison is made between the first read data and the user data. The comparison may be a direct comparison or an indirect comparison. In one non-limiting example, the first read data is 'decoded' and then the 'decoded first read data' is compared to the user data, which may be an indicative non-identity function of the original data written in step S411. It is noted that step S419' is just a special case of step S419—i.e. step S419' is just one implementation of an 'indirect comparison' associated with the comparison between the original data and the first read data described with reference to step S419 of FIG. 3.

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method for handling error correction, the method comprising
  a) writing original data to a portion of a memory;
  b) subsequent to the writing, reading from the portion of the memory, thereby generating first read data;
  c) comparing the first read data to the original data;
  d) subsequent to the comparing, reading from the portion of the memory, thereby generating second read data; and
  e) in accordance with results of the comparing of step (c), correcting errors in the second read data
    wherein the correcting of errors includes effecting at least one of:
    i) choosing one of a first decoder and a second decoder in accordance with the results of the comparing of step (c) and correcting errors using only the chosen decoder of the first and second decoders; or
    ii) choosing one of a first mode of a decoder and a second mode of the decoder in accordance with the results of the comparing of step (c) and correcting errors using only the chosen mode of the first and second modes.

2. The method of claim 1 wherein the memory is a volatile memory.

3. The method of claim 1 wherein the memory is a non-volatile memory.

4. The method of claim 3 wherein the non-volatile memory is a flash memory.

5. The method of claim 1 wherein the comparing of step (c) includes effecting at least one comparison selected from the group consisting of:
  i) a direct comparison between the first read data and the original data;
  ii) a direct comparison between the first read data and an indicative non-identity function of the original data;
  iii) a direct comparison between an indicative non-identity function of the first read data and the original data;
  and iv) a direct comparison between an indicative non-identity function of the first read data and an indicative non-identity function of the original data.

6. The method of claim 1 wherein the reading of step (b) is carried out in response to a completion of the writing of step (a).

7. The method of claim 6 wherein the reading of step (b) is carried out immediately after the completion of the writing of step (a).

8. The method of claim 1 wherein:
  i) the writing of step (a) is to a destination location within the memory; and
  ii) at least one of the reading of step (b) and the reading of step (d) is from the destination location within the memory.

9. The method of claim 1 further comprising determining at least one error indication selected from the group consisting of:
  i) a number of bit errors in the first read data;
  ii) a number of memory cells that contains erroneous data;
  iii) a list of one or more bit locations in which erroneous data is stored;
  iv) a list of one or more memory cells in which erroneous data is stored; and
  v) a value of a probability that a particular bit or plurality of bits in the first read data is erroneous,
  wherein the error correcting of step (e) is carried out in accordance with the determined at least one error indication.

10. The method of claim 1 wherein;
i) the original data is written, in step (a), to a main storage area of the memory;
ii) the reading of step (b) includes reading from the main storage area of the memory such that the first read data is generated from contents of the main storage area; and
iii) the method further comprises:
before the writing of step (a), reading from a cache area of the memory distinct from the main storage area of the memory in order to obtain the original data.

11. The method of claim 1 wherein the correcting of errors according to the results of the comparing of step (c) includes selecting a decoding bus width size in accordance with the results of the comparing of step (c).

12. The method of claim 1 wherein the correcting of errors in the second data according to the results of the comparing of step (c) includes determining, in accordance with the results of the comparing of step (c), one or more bit-probability values for the second read data.

13. A method for handling error correction, the method comprising:
a) copying original data from a cache area of a memory to a main storage area of the memory;
b) subsequent to the copying, reading from the main storage area of the memory, thereby generating first main storage read data;
c) subsequent to the copying, reading from the cache area of the memory, thereby generating cache read data;
d) comparing the cache read data to the first main storage read data;
e) subsequent to the comparing, reading from the main storage area of the memory, thereby generating second main storage read data; and
f) in accordance with results of the comparing of step (d), correcting errors in the second main storage read data,
wherein the correcting of errors includes effecting at least one of:
i) choosing one of a first decoder and a second decoder in accordance with the results of the comparing of step (d) and correcting errors using only the chosen decoder of the first and second decoders; or
ii) choosing one of a first mode of a decoder and a second mode of the decoder in accordance with the results of the comparing of step (d) and correcting errors using only the chosen mode of the first and second modes.

14. The method of claim 13 wherein the comparing of step (d) includes effecting at least one comparison selected from the group consisting of:
i) a direct comparison between the first main storage read data and the cache read data;
ii) a direct comparison between the first main storage read data and an indicative non-identity function of the cache read data;
iii) a direct comparison between an indicative non-identity function of the first main storage read data and the cache read data; and
iv) a direct comparison between an indicative non-identity function of the first read main storage data and an indicative non-identity function of the cache read data.

15. A method for handling error correction, the method comprising
a) writing original data to a portion of a memory;
b) subsequent to the writing, reading from the portion of the memory, thereby generating first read data;
c) determining, from the first read data, an indication of a difference between the first read data and the original data;
d) subsequent to the determining of the difference indication, reading from the portion of the memory, thereby generating second read data; and
e) in accordance with the difference indication, correcting errors in the second read data,
wherein the correcting of errors includes effecting at least one of:
i) choosing one of a first decoder and a second decoder in accordance with the results of the determining of step (c) and correcting errors using only the chosen decoder of the first and second decoders; or
ii) choosing one of a first mode of a decoder and a second mode of the decoder in accordance with the results of the determining of step (c) and correcting errors using only the chosen mode of the first and second modes.

16. A method for handling error correction, the method comprising
a) writing original data to a portion of a memory;
b) subsequent to the writing, reading from the portion of the memory, thereby generating first read data;
c) comparing the first read data to the original data;
d) subsequent to the comparing, reading from the portion of the memory, thereby generating second read data; and
e) in accordance with results of the comparing of step (c), correcting errors in the second read data,
wherein the correcting of errors includes at least one of:
i) performing an:
a) attempt to correct errors using a lighter-weight decoder or
b) to attempt to correct errors using only a heavier-weight decoder that is heavier than the lighter weight decoder; or
ii) performing an:
a) attempt to correct errors using a faster decoder or
b) to attempt to correct errors using only a slower decoder that is slower than the faster decoder; or
iii) performing an:
a) attempt to correct errors using a lighter-weight mode of a particular decoder or
b) to attempt to correct errors using only a heavier-weight mode of the particular decoder that is heavier than the lighter weight mode; or
iv) performing an:
a) attempt to correct errors using a faster mode of a particular decoder or
b) to attempt to correct errors using only a slower mode of the particular decoder that is slower than the faster mode.

* * * * *